United States Patent
Fausett et al.

(10) Patent No.: US 12,449,202 B2
(45) Date of Patent: Oct. 21, 2025

(54) MICROTUBE HEAT EXCHANGER DEVICES, SYSTEMS AND METHODS

(71) Applicant: INTERGALACTIC SPACEWORX, LLC, St. George, UT (US)

(72) Inventors: Taylor Fausett, Wailuku, HI (US); Nicholas F. Herrick-Kaiser, Passaic, NJ (US)

(73) Assignee: Intergalactic Spaceworx, LLC, St. George, UT (US)

( * ) Notice: Subject to any disclaimer, the term of this patent is extended or adjusted under 35 U.S.C. 154(b) by 247 days.

(21) Appl. No.: 17/979,859

(22) Filed: Nov. 3, 2022

(65) Prior Publication Data

US 2023/0051864 A1    Feb. 16, 2023

Related U.S. Application Data

(63) Continuation of application No. 16/911,346, filed on Jun. 24, 2020, now Pat. No. 11,519,670.

(60) Provisional application No. 62/972,836, filed on Feb. 11, 2020.

(51) Int. Cl.
| | |
|---|---|
| F28D 1/053 | (2006.01) |
| B64D 13/06 | (2006.01) |
| B64D 13/08 | (2006.01) |
| F28D 1/02 | (2006.01) |

(52) U.S. Cl.
CPC ....... F28D 1/05333 (2013.01); F28D 1/0246 (2013.01); B64D 2013/0603 (2013.01); B64D 13/08 (2013.01); F28D 2001/0273 (2013.01); F28F 2260/02 (2013.01); F28F 2275/067 (2013.01)

(58) Field of Classification Search
CPC .............. F28D 1/05333; F28D 1/0246; F28D 2001/0273; F28F 2260/02; F28F 2275/067; B64D 13/08; B64D 2013/0273
See application file for complete search history.

(56) References Cited

U.S. PATENT DOCUMENTS

| | | |
|---|---|---|
| 7,628,883 B2 | 12/2009 | Daly et al. |
| 11,135,688 B2 | 10/2021 | Englmeier |
| 11,859,921 B1 | 1/2024 | Kelly et al. |
| 2002/0162651 A1 | 11/2002 | Nakagome et al. |
| 2012/0211158 A1* | 8/2012 | Becnel ...................... F28F 9/18 228/175 |
| 2015/0101334 A1 | 4/2015 | Bond et al. |

OTHER PUBLICATIONS

Mezzo Microchannel Radiator Wins Borgwarner Louis Schwitzer Award, May 21, 2010, https://www.indianapolismotorspeedway.com/news-multimedia/news/2010/05/21/mezzo-microchannel-radiator-wins-borgwarner-louis-schwitzer-award.
Baton Rouge's Mezzo Technologies Looking Beyond Racecar Tracks to Space, Updated Jul. 29, 2019, The Advocate, https://www.theadvocate.com/baton_rouge/news/business/baton-rouge-s-mezzo-technologies-looking-beyond-racecar-tracks-to-space/article_7b8701c7-11e4-5db5-b2be-1238ba3a91e4.html.

(Continued)

*Primary Examiner* — Jon T. Schermerhorn, Jr.
(74) *Attorney, Agent, or Firm* — McGarry Bair PC

(57) ABSTRACT

A microtube heat exchanger is disclosed, including two end plates with an array of holes or openings and an array of microtubes disposed in the array of openings between the two end plates. The heat exchanger can be used in environmental control systems, including systems for aerospace applications.

19 Claims, 46 Drawing Sheets

(56) References Cited

OTHER PUBLICATIONS

ARPA-E Projects to Develop New Technologies for High Performance Heat Exchangers, Components, Mar. 22, 2019, https://www.energy.gov/articles/doe-announces-36-million-high-temperature-materials-projects.

Breedlove et al., Turbo-Brayton Converter for Radioisotope Power Systems, Nuclear and Emerging Technologies for Space, American Nuclear Society Topical Meeting, Richland, WA, Feb. 25-28, 2019.

Izenson et al., Integrated Oxygen Flow Meter/Heat Exchanger for Portable Life Support Systems, 48th International Conference on Environmental Systems, Albuquerque, NM, Jul. 8-12, 2018.

Complaint, *International Mezzo Technologies, Inc.*, Plaintiff v. *Airborne ECS, LLC*, In the United States District Court Middle District Louisiana, Case No. 3:23-cv-01620-BAJ-RLB, pp. 1-16.

Farmer et al., Defendant Airborne ECS, LLC's Rule 131 Preliminary Claim Constructions and Extrinsic Evidence, May 30, 2025, Case No. 2:24-cv-01368-JNW, United States District Court Western District of Washington at Seattle.

LPR131(A)—Plaintiff's Preliminary Claim Constructions, May 30, 2025, Case No. 2:24-cv-01368-JNW, United States District Court Western District of Washington at Seattle.

Gummer et al., Plaintiff International Mezzo Technologies, Inc.'S Invalidity Contentions, Apr. 25, 2025, Case No. 2:24-cv-01368-JNW, United States District Court Western District of Washington at Seattle.

Exhibit A—Mezzo's Invalidity Claim Chart for U.S. Pat. No. 11,519,670 B2 ('670 Patent), Apr. 25, 2025, Case No. 2:24-cv-01368-JNW, United States District Court Western District of Washington at Seattle.

* cited by examiner

MICROTUBE HEAT EXCHANGER DEVICES, SYSTEMS AND METHODS

PRIORITY CLAIM

This application is a continuation application of U.S. application Ser. No. 16/911,346, filed on Jun. 24, 2020 and entitled "Microtube Heat Exchanger Devices, Systems and Methods", which claims the benefit of the filing date of U.S. Provisional Application Ser. No. 62/972,836, filed on Feb. 11, 2020 and entitled "Microtube Heat Exchanger Devices, Systems and Methods".

FIELD OF THE TECHNOLOGY

The present technology relates to microtube heat exchangers for use in aerospace and more particularly to the manufacture and use of microtube heat exchangers in environmental control systems, including for aerospace.

BACKGROUND OF THE TECHNOLOGY AND RELATED ART

Environmental control systems are used in aerospace applications to cool or heat aircraft systems and human occupant compartments. Example systems in which an environmental control system is used include electronic systems such as avionics, radar, electric power systems, accessory electronics for mission needs, and the like, as well as mechanical systems such as engine cooling, hydraulic cooling, engine bleed air cooling, among others. This is accomplished by heating or cooling of fluids, typically air or a liquid coolant. Traditionally, efficiency requirements and limitations in technology control the minimum size of heat exchangers required for certain systems. For example, various aerospace applications may require refrigerant to air, refrigerant to liquid, liquid to liquid, air to liquid, or air to air cooling to expel heat from various components of the system. A heat exchanger, sometimes referred to as a condenser or evaporator, is used in such systems, including environmental control systems.

As aerospace applications of environmental control systems continue to demand more efficient systems with smaller size requirements under continuously increasing thermal loads with increasing number of systems, there remains a need for improved heat exchangers.

BRIEF DESCRIPTION OF THE DRAWINGS

The present technology will become more fully apparent from the following description and appended claims, taken in conjunction with the accompanying drawings. Understanding that these drawings merely depict exemplary aspects of the present technology, they are therefore not to be considered limiting of its scope. It will be readily appreciated that the components of the present technology, as generally described and illustrated in the figures herein, could be arranged and designed in a wide variety of different configurations. Nonetheless, the technology will be described and explained with additional specificity and detail through the use of the accompanying drawings in which:

FIG. 6a is front view of a heat exchanger core in accordance with one aspect of the technology;

FIG. 6b is a side view of the heat exchanger core of FIG. 6a;

FIG. 40b is a side view of the microtube heat exchanger core of FIG. 40a;

FIG. 40c is an annotated end view of the microtube heat exchanger core of FIG. 40a;

FIG. 42a is a perspective view of a microtube heat exchanger core including foreign object debris or damage protection according to aspects of the technology;

FIG. 42b is a partial cross-sectional view of the microtube heat exchanger core of FIG. 42a;

FIG. 43a is a perspective view of another microtube heat exchanger core including foreign object debris or damage protection according to aspects of the technology;

FIG. 43b is a partial cross-sectional view of the microtube heat exchanger core of FIG. 43a;

DETAILED DESCRIPTION

Figure 1:
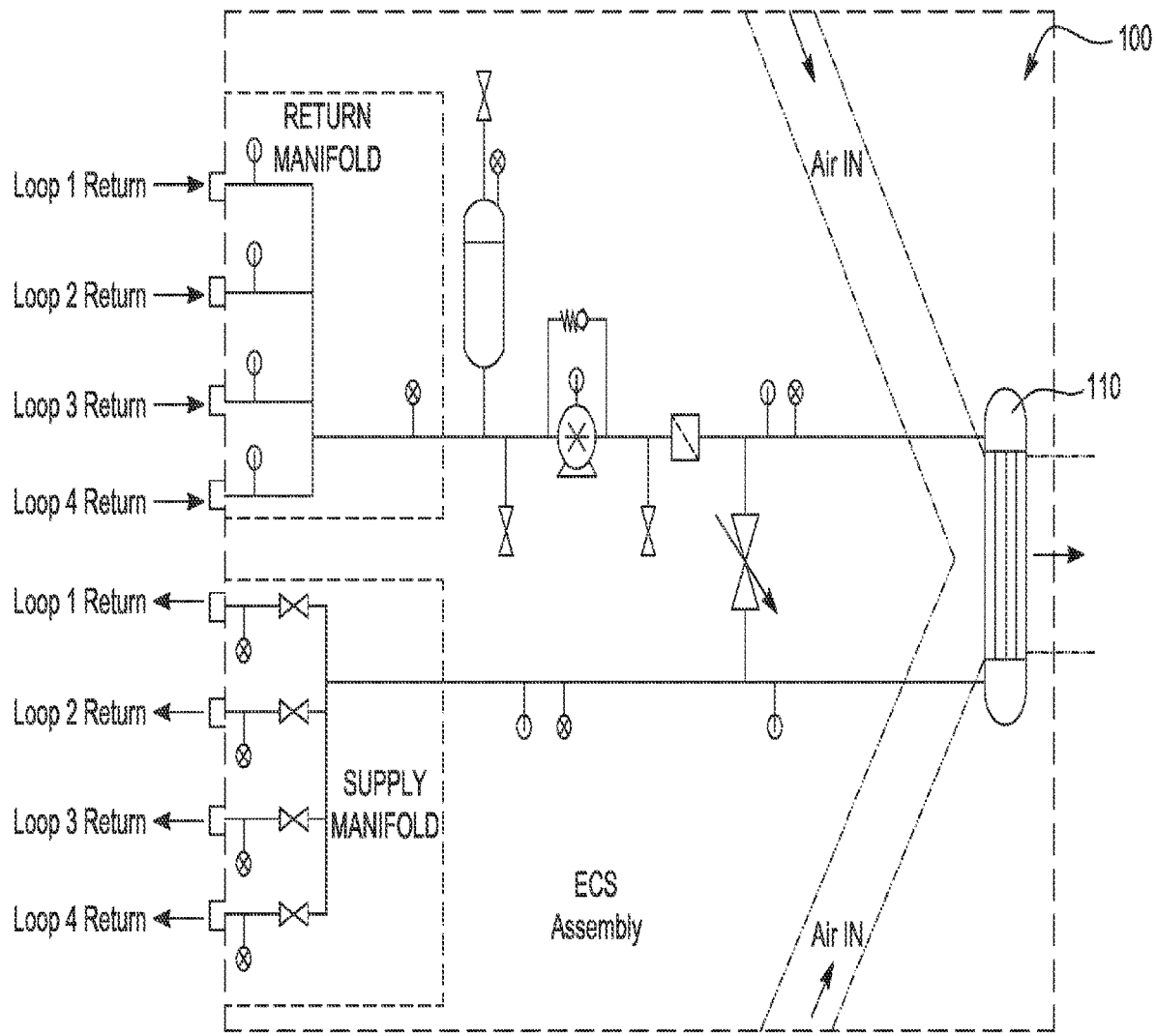
FIG. 1 is a schematic of a system in accordance with one aspect of the technology.

The following detailed description of exemplary aspects of the technology makes reference to the accompanying drawings, which form a part hereof and in which are shown, by way of illustration, exemplary aspects in which the technology may be practiced. While these exemplary aspects are described in sufficient detail to enable those skilled in the art to practice the technology, it should be understood that other aspects may be realized and that various changes to the technology may be made without departing from the spirit and scope of the present technology. Thus, the following more detailed description of the aspects of the present technology is not intended to limit the scope of the technology, as claimed, but is presented for purposes of illustration only and not limitation to describe the features and characteristics of the present technology and to sufficiently enable one skilled in the art to practice the technology. Accordingly, the scope of the present technology is to be defined solely by the appended claims.

The following detailed description and exemplary aspects of the technology will be best understood by reference to the accompanying drawings, wherein the elements and features of the technology are designated by numerals throughout.

The present technology includes an improved heat exchanger for use in aerospace systems. In just one embodiment, the improved heat exchanger is used in an environmental control systems (ECS), however other applications will be discussed and contemplated herein. To provide this heat rejection issue in the aerospace industry, the efficiency of the heat exchanger must be increased. This present technology includes use of a micro-tube style heat exchanger to reject or absorb heat in an aerospace environment on board of new and existing aircraft and aircraft pod applications. The microtube heat exchangers can be of any size and shape of which an array of tubes is utilized as the method of transferring heat from one fluid to another. In one aspect of the technology, the tubes are individual hollow tubes, such as cylindrical tubes with a circular cross section, or tubes having other cross sections such as square, triangular, oval or elliptical, that are converted from an individual state and built into one unit as a device called a micro-tube heat exchanger. The heat exchanger may be a cross-flow device, or it may be a parallel-flow or counter-flow device. The microtube heat exchanger is built such that the entire array of thousands, but not limited to thousands, of microtubes is held together as one structure and acts as one single component in the aircraft system. The microtube heat exchanger consists of an array of tubes that passes either a water or oil based liquid, 2-phase refrigerant, or gas through the center of the tubes, and allows either a gas or a water or oil based liquid to cross over the tubes in cross-directional flow, or in a parallel flow or a counter flow, depending on the application, to complete the heat exchange with the fluid travelling down the center of the tubes.

In other aspects of the technology, the addition of a microtube heat exchanger to an aircraft ECS system allows for greater heat exchange than previously capable. The fluid used as a coolant passes through a pump or boosting pump, and instead of passing through a traditional heat exchanger, the present system incorporates a microtube heat exchanger improving the efficiency of the system. The fluid then continues through to the aircraft equipment and returns to the ECS expansion tank. The microtube heat exchanger systems of the present technology allows for more compact and efficient heat exchange than existing ECS and heat exchange systems. In addition to increasing the efficiency of heat exchange, adding a microtube heat exchanger to a heat exchange system, such as an aircraft ECS, allows other components of the system to be more efficient. For example, the efficiency of the microtube heat exchanger in an aircraft ECS allows for less demand on the compressor and pump in the ECS. The decreased demand allows for reductions in size and weight of the components, which advantageously allows for further reductions at the system level The aspects of the technology discussed herein are applicable to a variety of systems in the aerospace industry, including all environmental control systems in the aerospace industry. As discussed above, the present technology is also applicable to all aircraft, all aircraft systems, which includes all environmental control systems and all accessory aircraft systems including roll on equipment and weapons systems, especially direct energy weapons, and all aircraft pod systems in an aerospace environment The present technology can also be applicable to an array of customers across aerospace applications and other industries.

Throughout this disclosure, the terms microtube heat exchanger and microtube heat exchanger core may be used interchangeably. It is understood that the microtube heat exchanger cores depicted and described in the present technology may be employed in any standard microtube heat exchange system. In one aspect of the technology, a microtube heat exchanger uses a microtube heat exchanger core in the place of a traditional heat exchanger core. It is also understood that the present technology relates to retrofitting existing systems to replace a traditional heat exchanger with a more efficient microtube heat exchanger, and that it also relates to new heat exchange systems incorporating microtube heat exchangers having microtube heat exchanger cores.

As used herein, the term "liquid" will be understood to reference a fluid in liquid form, but shall not limit the present technology to any other form a fluid. In other words, the microtube heat exchangers of the present technology may be used in any fluid application, including liquids, gases or plasmas. It has been found that there is a threshold of tube diameter such that when the tube diameter gets small enough, the efficiency of an array of those tubes can be greater in both "heat transfer per pound" or "heat transfer per volume" than existing methods.

The present technology is applicable to, and is intended to be applicable to all systems for all aircraft, which includes all aircraft environmental control systems, all accessory aircraft systems including roll on equipment and weapons systems, especially direct energy weapons, and all aircraft pod systems in any aerospace environment. Aspects of the technology can also be applicable to other users. In other words, the microtube heat exchanger of the present technology can be used in any aerospace system requiring a heat exchanger. For example, the microtube heat exchanger can be used in environmental control systems, such as occupant cooling/heating, avionics cooling, auxiliary electronics cooling, auxiliary equipment cooling such as pods, engine oil cooling, transmission oil cooling, and auxiliary power unit cooling. Any of these systems may be vapor cycle systems involving two-phase refrigerant, air cycle systems involving single phase bleed-air driven cooling systems, passive liquid systems involving a single phase liquid, and passive gas systems involving a single phase gas, such as air. It is also be understood that the present technology relates to additional relevant aerospace systems, including systems on aircraft and systems on spacecraft.

With specific reference now to FIG. 1, FIG. 1 is a general a schematic for a microtube heat exchange system 100 in accordance with one aspect of the technology. The heat from a coolant is ejected into the air that flows through the microtube heat exchanger 110. This system may be an environmental control system that utilizes microtube heat exchangers in a cross-flow, annular radiator configuration. Such systems are highly efficient, with small sizes and low pressure drops.

At the most basic level, a microtube heat exchange system includes a microtube heat exchanger, which includes a heat exchanger core using microtubes. One example of a microtube heat exchanger core is shown in FIGS. 2-3.

In aspects of the present technology, the microtube heat exchanger core includes at least a first end plate 220 and second end plate 230, each end plate having an array of openings 225. In other examples, one or more mid plates 240 may be disposed within the heat exchanger. The exchanger also includes an array of microtubes 250 disposed between the first and second end plates. The microtubes can be laser welded to the end plates. In other examples, the microtubes are attached by way of other means developed for precisely joining two very small elements such as the microtubes and the openings. For example, other means may include brazing or soldering. In aspects of the technology, the microtubes 250 and end plates 220, 230 make up a heat exchanger that is installed in a heat exchange system that is installed in an aerospace application. The microtubes and end plates can be stainless steel, with the microtubes laser welded to the end plates, as discussed herein. In other aspects of the technology, the microtubes and end plates can be any metal suitable for aerospace, including steel, aluminum, brass, or any allows thereof.

Figure 2:
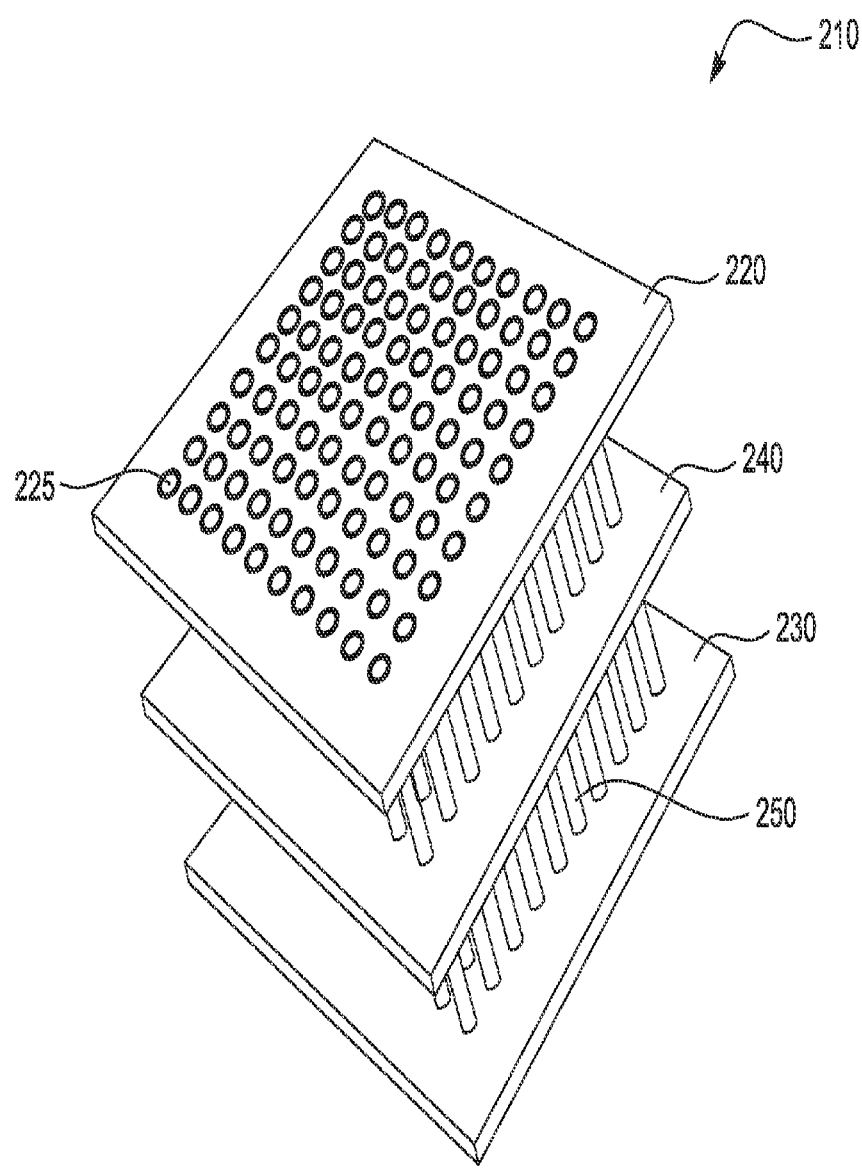
FIG. 2 is a top perspective view of a heat exchanger core in accordance with one aspect of the technology.
Figure 3:
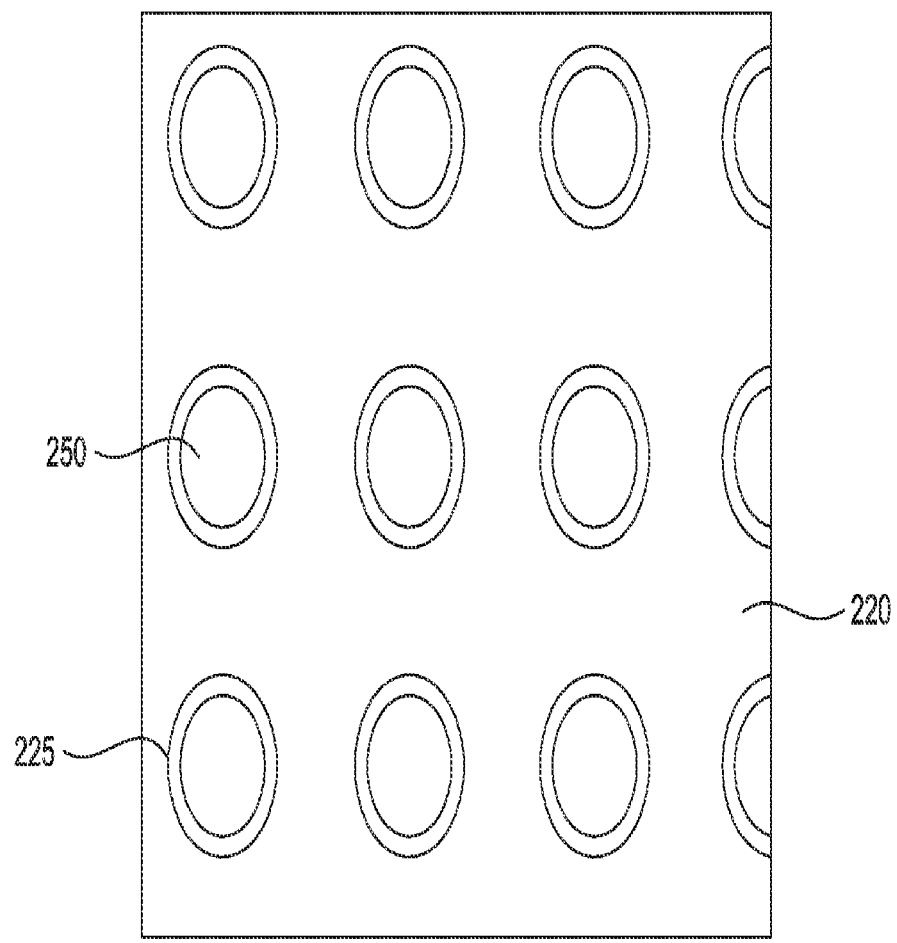
FIG. 3 is a detailed top view of the heat exchanger core of FIG. 2.

As further depicted in FIGS. 2-3, in one aspect of the technology the array of openings 225 in the end plates form straight longitudinal rows parallel to the direction of fluid flow and straight transverse rows normal to the direction of fluid flow. In yet other examples, as discussed herein, the array of openings in the end plates form staggered longitudinal and transverse rows.

The microtube heat exchanger according to aspects the present technology can include an array of microtubes forming a cylinder, a rectangle, or any other shape, such as a square, an arc, a curve, or a horse-shoe shape. The specific dimensions of the arrangement of microtubes can be customized to fit any application, including customization based on the size or footprint requirements, and also customization based on the flow properties and requirements.

In aspects of the technology, the microtube heat exchanger is installed in an aerospace heat exchange system such as an environment control system. For example, the environmental control system can include a first fluid flowing through the inside of the array of microtubes and second fluid flowing across the outside of the array of microtubes.

Figure 34:
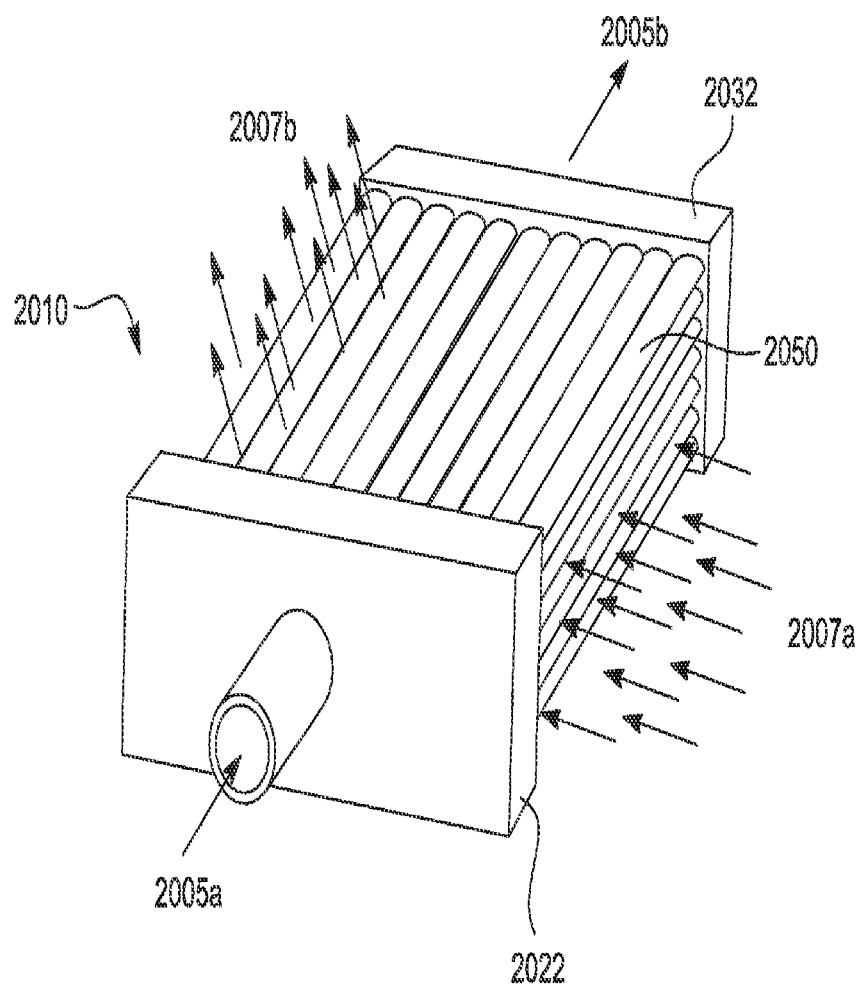
FIG. 34 is a perspective view of a heat exchanger using the arrangement of microtubes of FIG. 32.
Figure 35:
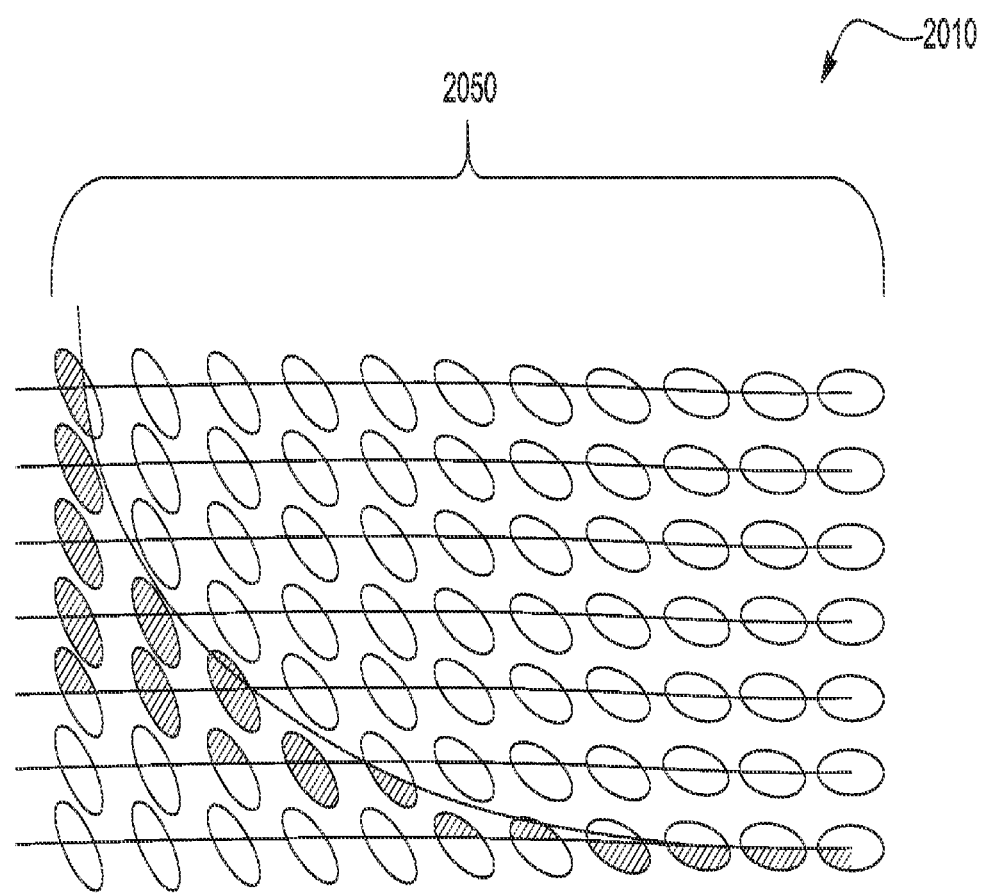
FIG. 35 is a chart illustrating the arrangement of microtubes of FIG. 32.

The microtube heat exchanger in one aspect of the present technology can include specific ratios of the diameter of each microtube compared to the spacing between the tubes, either in the longitudinal spacing, or the transverse spacing, as further described and depicted in FIGS. 34-35. In some aspects of the present technology involving in-line arrangements of microtubes, the ratio of the diameter of the tube to the longitudinal spacing between the centers of each tube is 1.25. In other aspects, the ratio can be between 1 and 5.0. In yet other aspects, a range between 1 and 20 may be used. In some aspects of the technology, the ratio of the diameter of the tube to the transverse spacing between the centers of each tube is 2.75. In yet other examples, the spacing can be between 2.0 and 10.0. And again, in other aspects, a range between 1.01 and 20 may be used. Now with reference to off-set arrangements of microtubes, the ratio of the diameter of the tube to the longitudinal spacing between the centers of each tube can be 1.3. In other examples, the ratio can be between 1.01 and 10.0, or can be between 1.01 and 20. In the same off-set arrangements, the ratio of the diameter of the tube to the transverse spacing between the centers of each tube can be 1.5, or in other examples between 1.01 and 10.0, or can be between 1.01 and 20. It will be understood by those of ordinary skill in the art based on the present technology that other ratios are contemplated and may be applicable to specific situations based on the properties and requirements involved.

In aspects of the technology, the microtubes for use in the microtube heat exchangers are cylindrical microtubes having circular cross sections. In yet other examples, as disclosed herein, other cross sections and shapes of tubes can be used. When cylindrical microtubes are used, a tube size of 0.010 inches to 0.080 inches at the outer diameter can be used. The tube wall thickness may range between 0.0005 inches and 0.010 inches. The tube length can range between 0.5 inches and 240 inches. The overall heat exchanger width can range between 0.5 inches and 240 inches, and the depth of the heat exchanger, or in other words one row of tubes, can range between 0.012 inches and 24 inches. The present technology will make it clear to those of ordinary skill in the art the variations hereof that are applicable and covered by the present disclosure.

In other aspects of the technology, a heat exchange system, such as a vapor cycle system, air cycle system, passive liquid or gas system, is disclosed including a microtube heat exchanger having two end plates, each having an array of openings. The exchanger also includes an array of microtubes disposed between the two end plates, where the microtubes are laser welded to the end plates. In aspects of the system, a first fluid travels through the microtubes of the heat exchanger and a second fluid contacts the outside of the microtubes. In aspects of the technology, the vapor cycle system is configured and adapted for use in aerospace.

As further discussed herein, the array of microtubes can form straight longitudinal rows parallel to the direction of fluid flow and straight transverse rows normal to the direction of fluid flow. In other examples of the system the array of microtubes can form staggered longitudinal and transverse rows. The array of microtubes can form one of a cylinder, rectangle, a square, an arc, a curve, or horse shoe shape. In yet other examples, any geometrical configuration can be formed by the array of microtubes.

Figure 4:
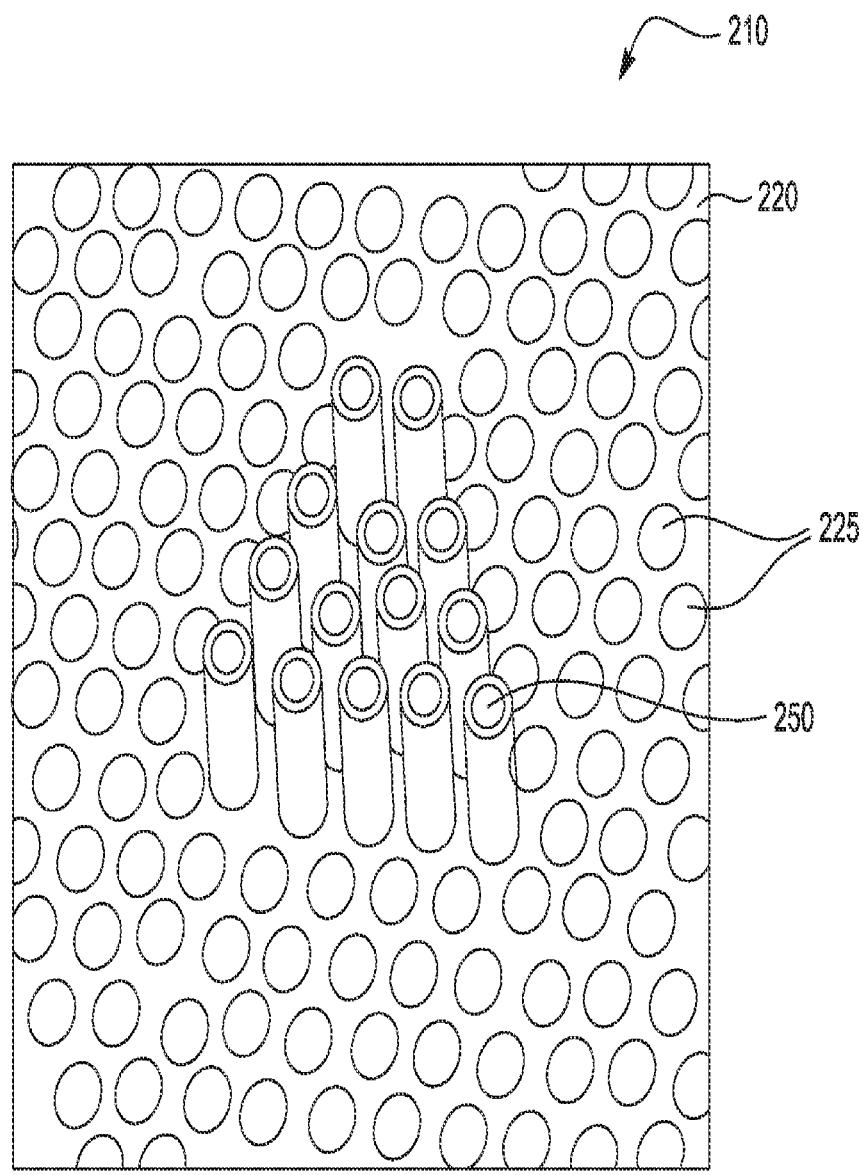
FIG. 4 is an inside perspective view of a heat exchanger end plate in accordance with one aspect of the technology, while in the middle of being built.

According to some aspects of the technology, the array of microtubes 250 are aligned with the array of openings 225 as shown in FIG. 4. Portions of the microtubes 250 are shown in arrangement on an end plate 220. The end plate 220 may include an arrangement of holes or openings 225, which may take the form of a pattern. In some aspects of the technology, the pattern of the holes 225 in the end plate is arranged to reduce the surface area of the end plate, minimizing the resistance that the end plate causes to flow of the liquid into the microtubes. In other aspects of the technology, the arrangement of the openings 225 in the end plate is chosen based on the external flow characteristics desired, or in other words, to arrange the microtubes for specific applications based on the external fluid that will flow over the outside of the microtubes, as described more fully herein.

Figure 5:
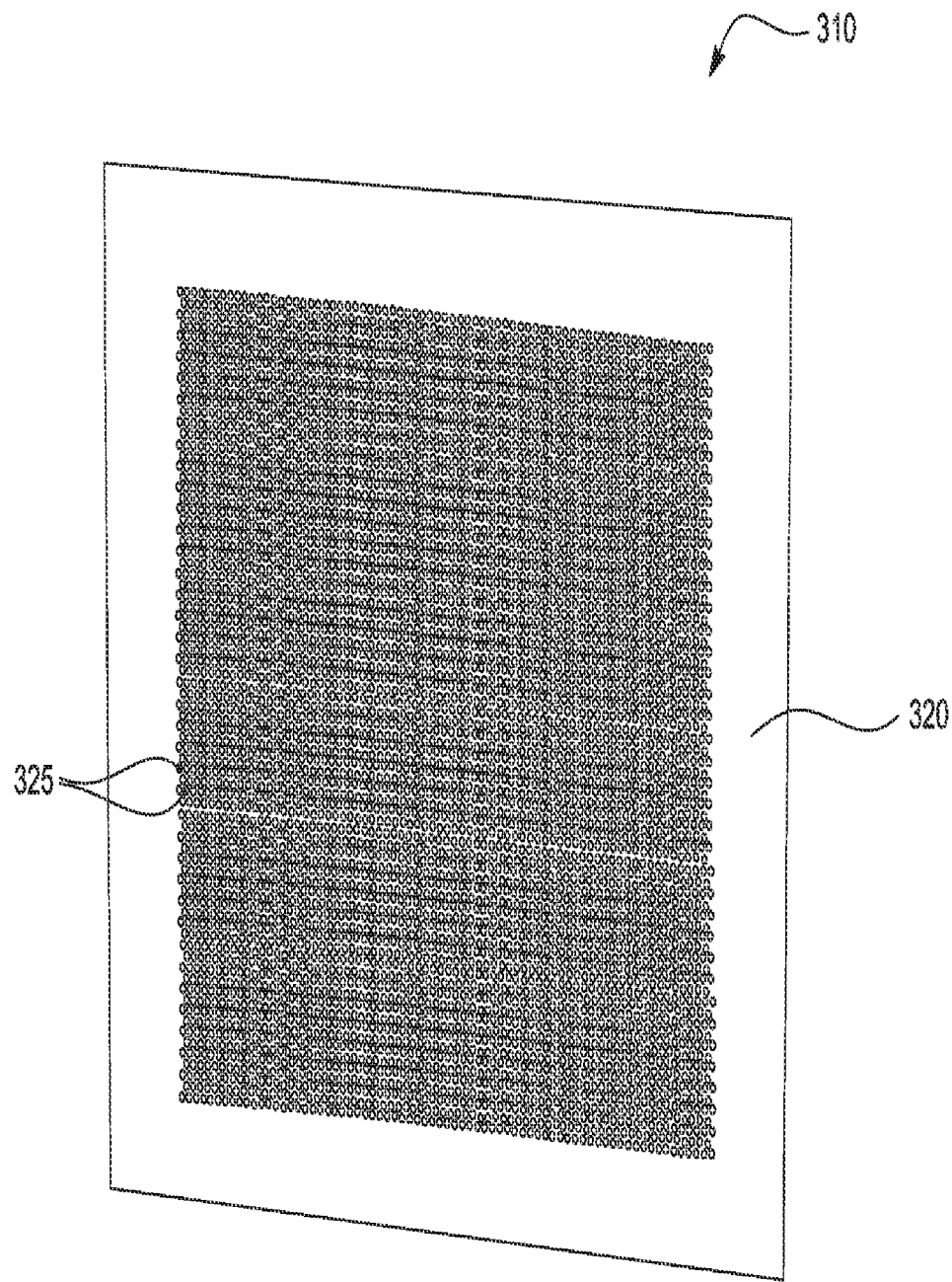
FIG. 5 is a front view of another heat exchanger end plate in accordance with one aspect of the technology.

Another example of a microtube heat exchanger 310 is depicted in FIG. 5. The end plate 320 of the microtube heat exchanger 310 is shown, with the pattern of holes or openings 325 leading to microtubes (not shown) behind the end plate 320. In this example, the holes are arranged in an offset or staggered pattern, as described with reference to FIGS. 34-35.

Figures 6A, 6B:
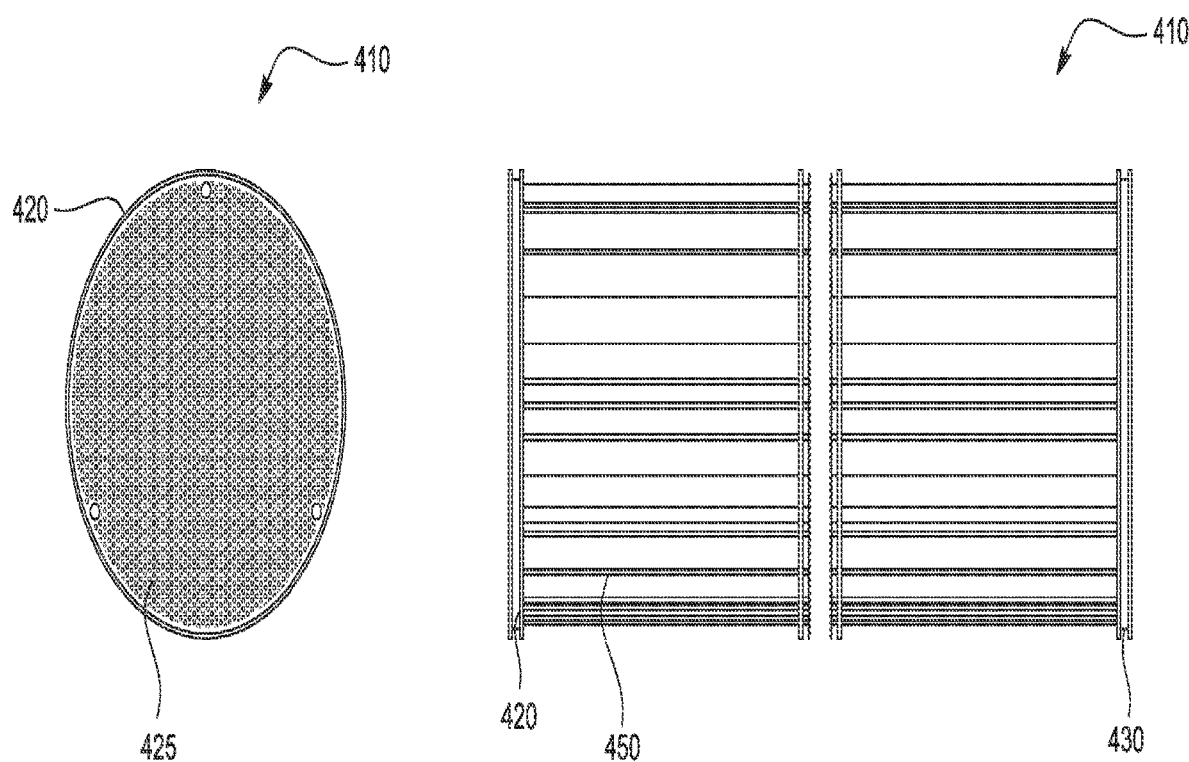

FIGS. 6a-6b show a microtube heat exchanger core 410 in accordance with one aspect of the present technology. The heat exchanger 410 includes an array of microtubes 450 arranged in a cylindrical shape with a first end plate 240 on one end and a second end plate 430 on another end. A fluid, such as a coolant or other liquid, flows through the tubes while another fluid, such as a liquid or gas, in most cases air, flows across the tubes to effectuate the heat exchange. Such a heat exchanger can be used in single phase or dual phase systems. A fluid pump can be used in such systems to keep the fluid flowing within the tubes, separate from the fluid flowing across the tubes. As shown in FIG. 6a by the array of openings 425, the array of microtubes 450 includes thousands of microtubes that are welded to the end plates 420, 430. In some examples, the microtubes 450 are laser welded to the end plates 420, 430 as described herein. In other aspects of the technology, the microtubes may be cast or 3D printed together with the end plates.

Figure 7:
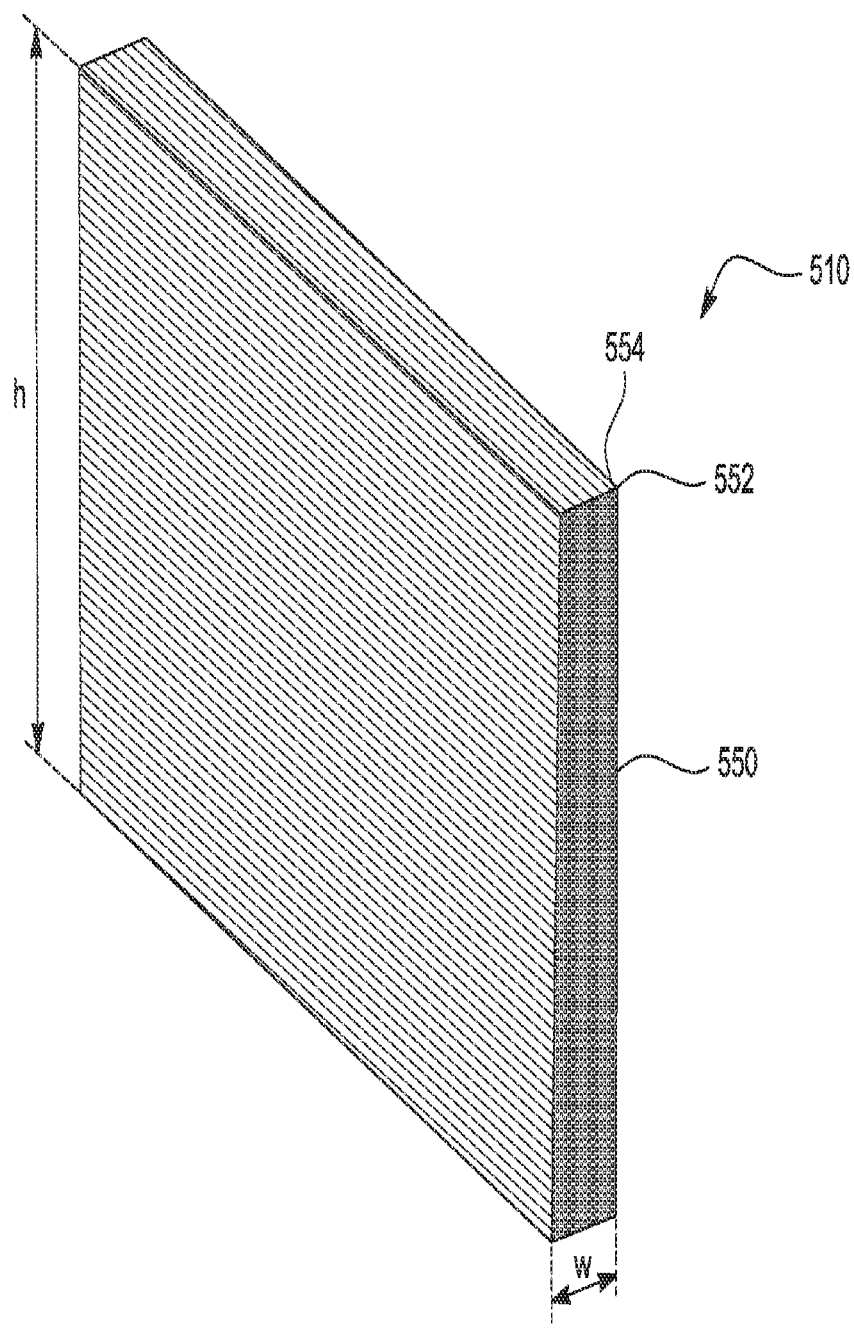
FIG. 7 is a perspective view of an array of microtubes according to one aspect of the technology.
Figure 8:
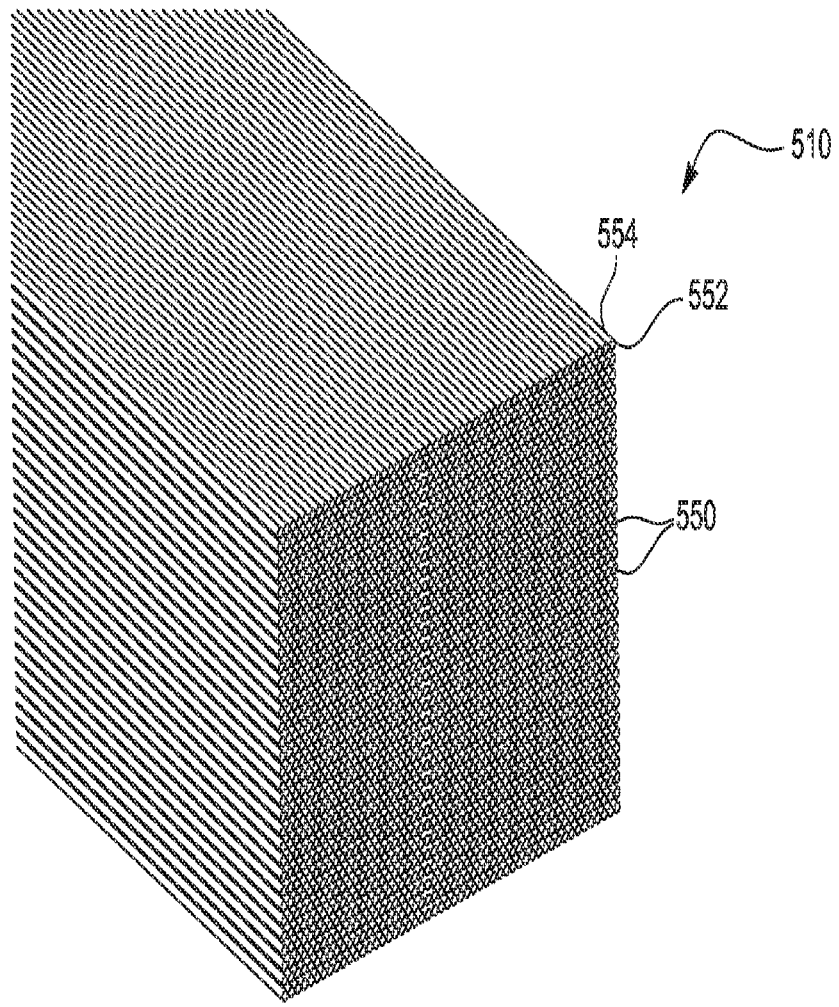
FIG. 8 is a perspective view of an array of microtubes in accordance with another aspect of the technology.
Figure 9:
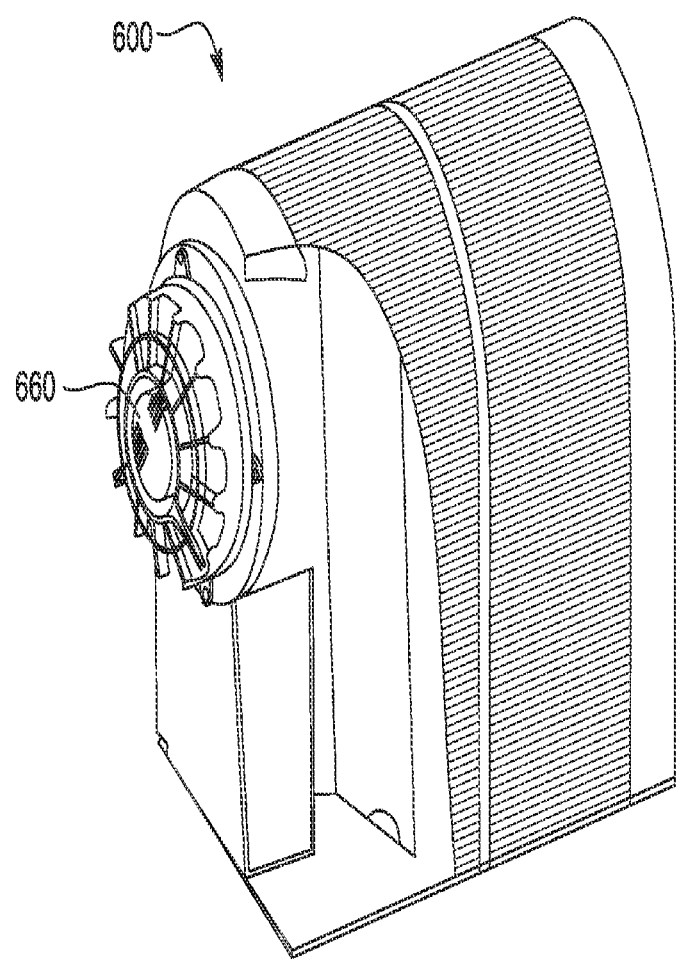
FIG. 9 is a microtube heat exchange system in accordance with one aspect of the technology.
Figure 10A:
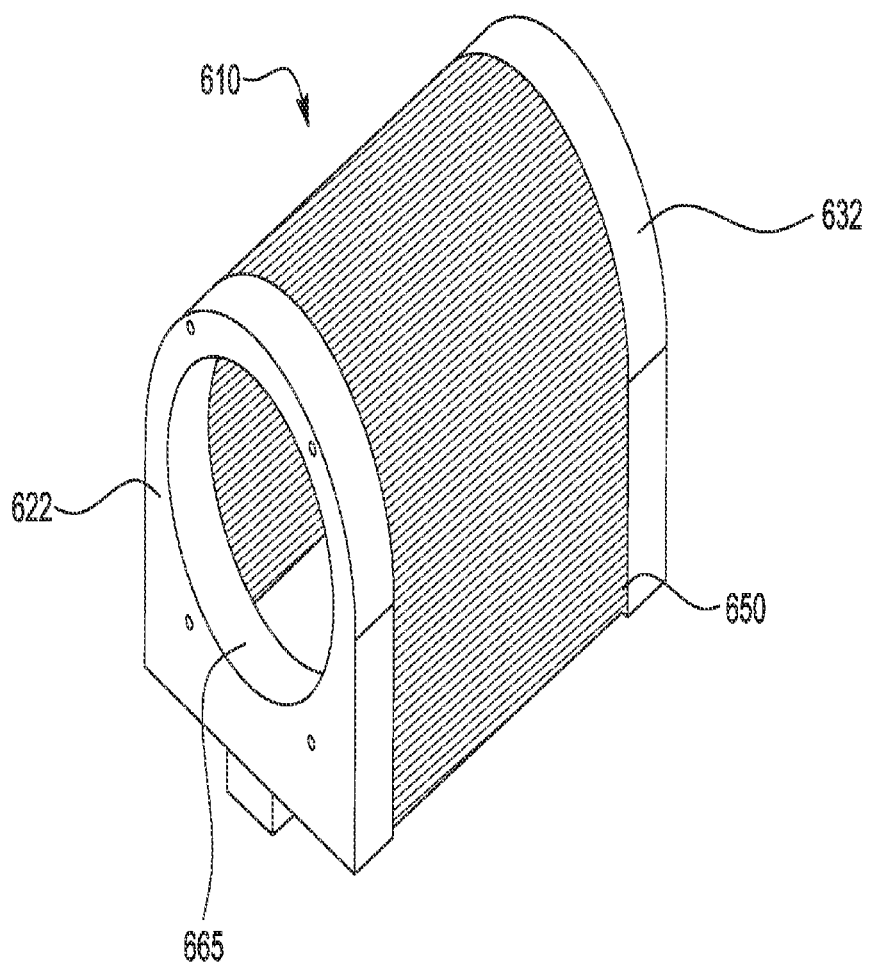
FIG. 10a is an isometric view of the microtube heat exchanger of the system of FIG. 9.
Figure 10B:
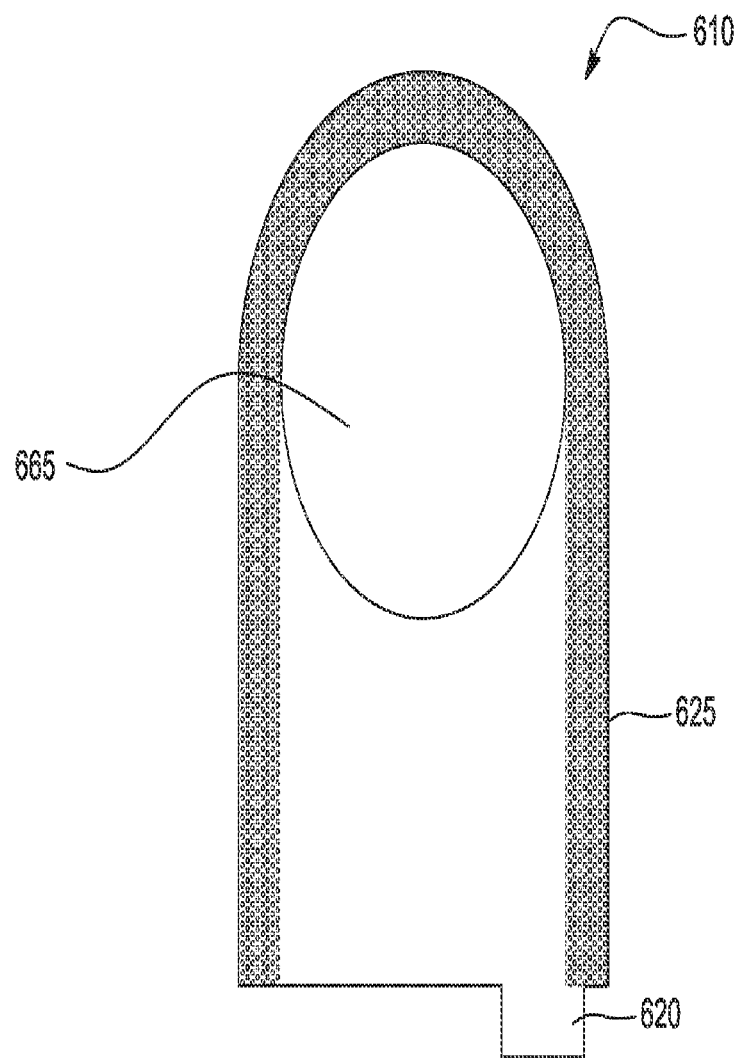
FIG. 10b is a cutaway view of the microtube heat exchanger of the system of FIG. 9.
Figure 11:
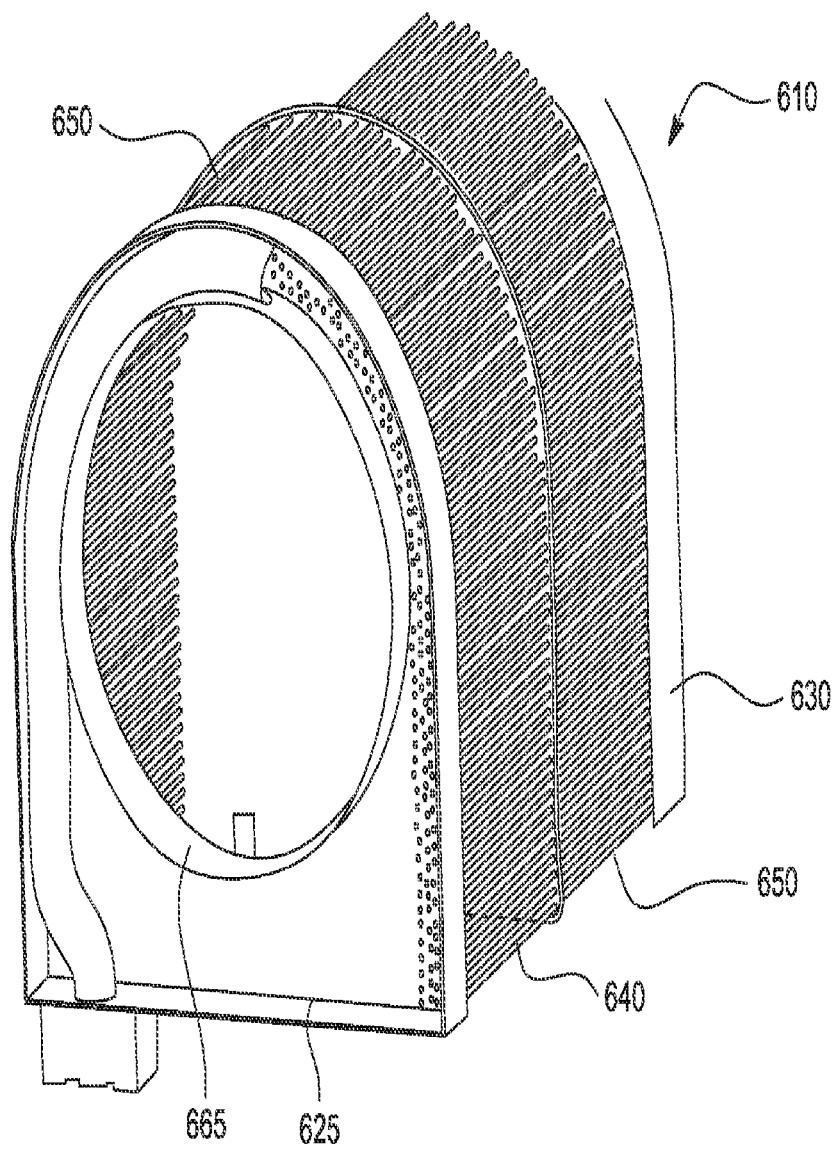
FIG. 11 is an end isometric cutaway view of the microtube heat exchanger of the system of FIG. 9.
Figure 12:
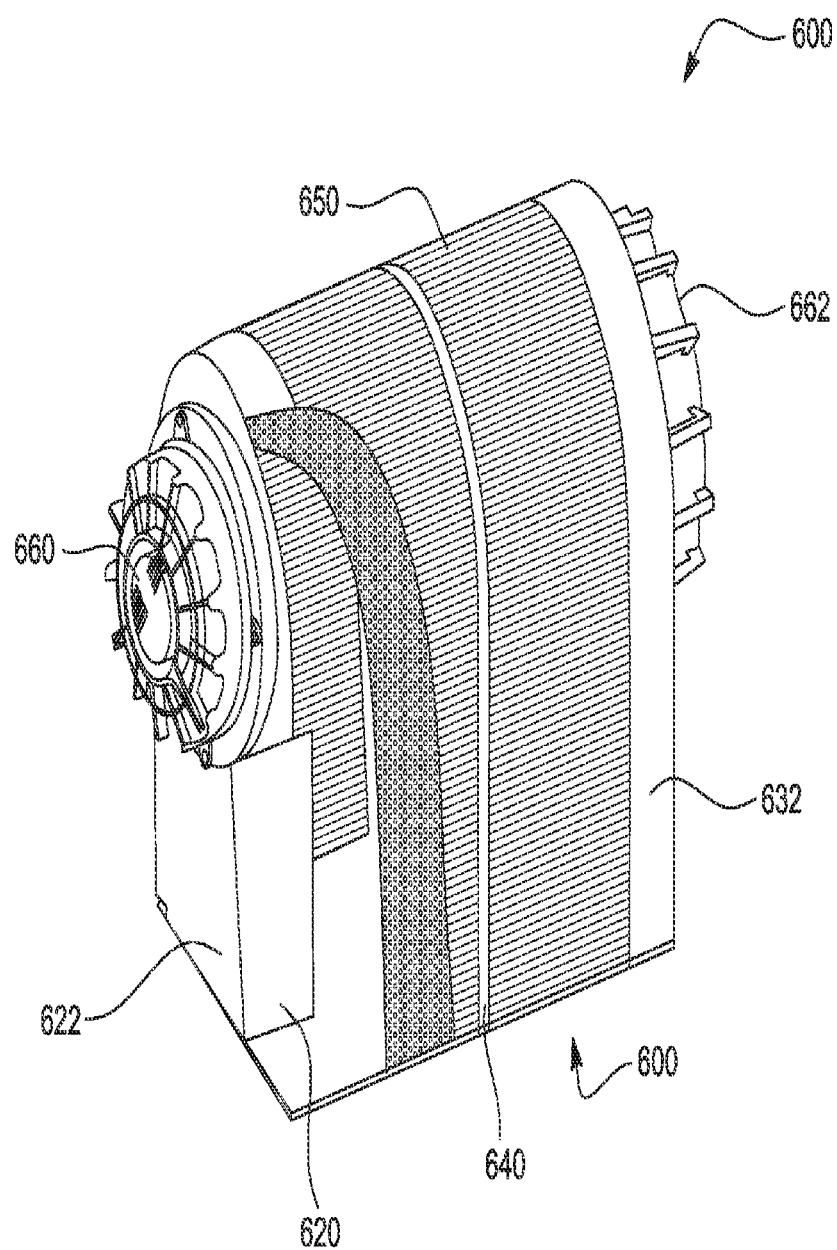
FIG. 12 is a cutaway view of the microtube heat exchanger of the system of FIG. 9.
Figure 13:
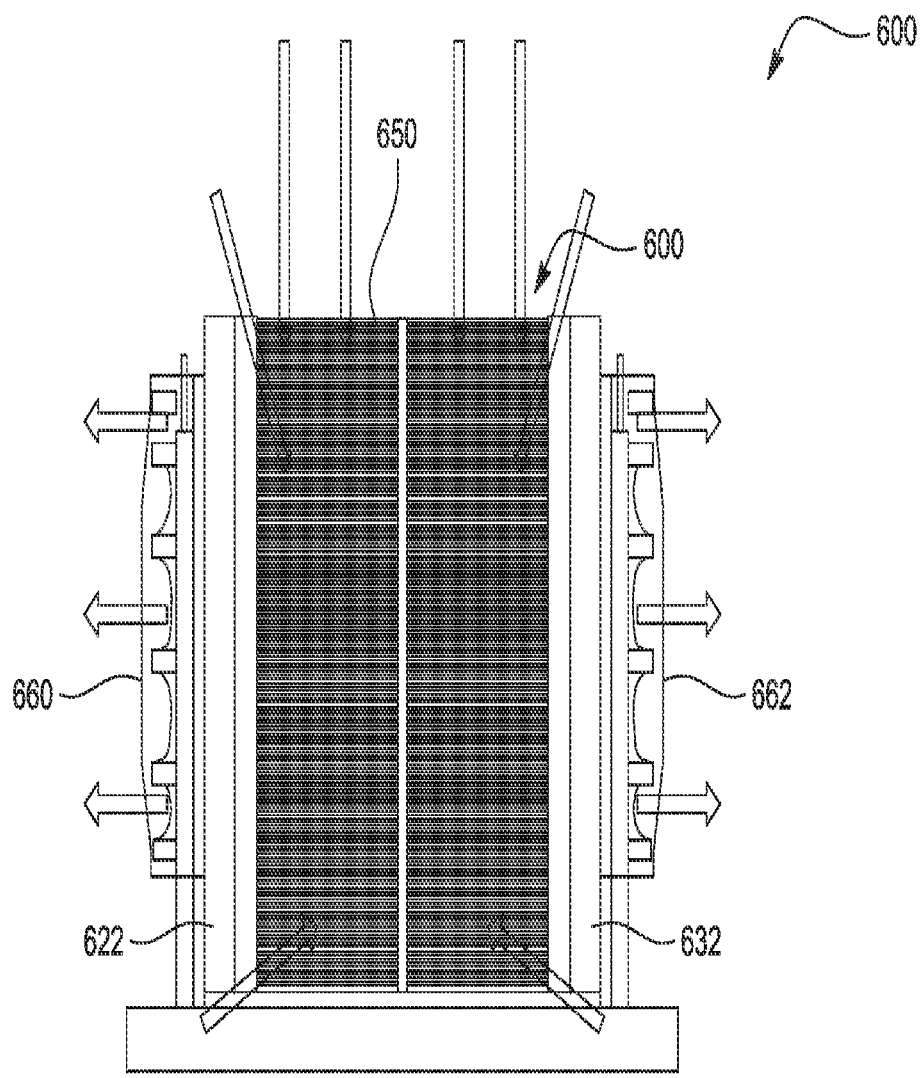
FIG. 13 is a diagram of airflow in the system of FIG. 9.

FIGS. 7-8 show yet another heat exchanger microtube array example according to aspects of the technology. The microtubes may be arranged in a rectangular heat exchanger, in contrast to the cylindrical heat exchangers previously discussed. The rectangular heat exchanger includes thousands of microtubes arranged in rows and columns, each welded to an end plate on each end which then forms the microtube heat exchanger. As previously discussed, a fluid within the tubes is cooled as another fluid runs across the tubes.

Figure 14:
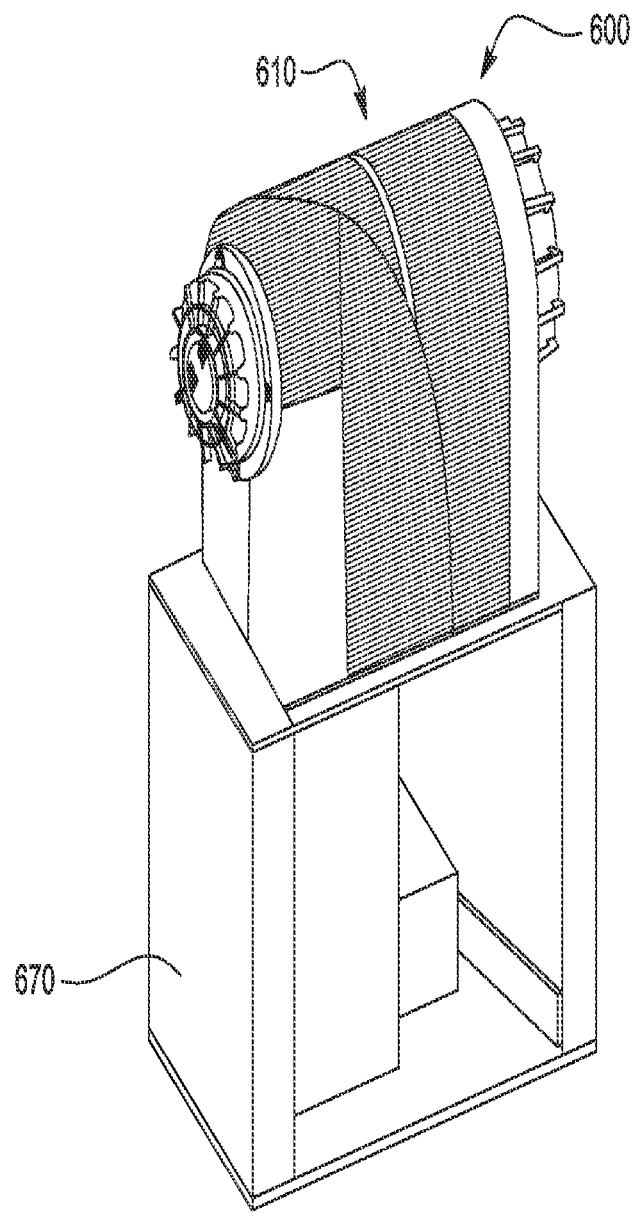
FIG. 14 is a front cutaway view of the system of FIG. 9.
Figure 15:
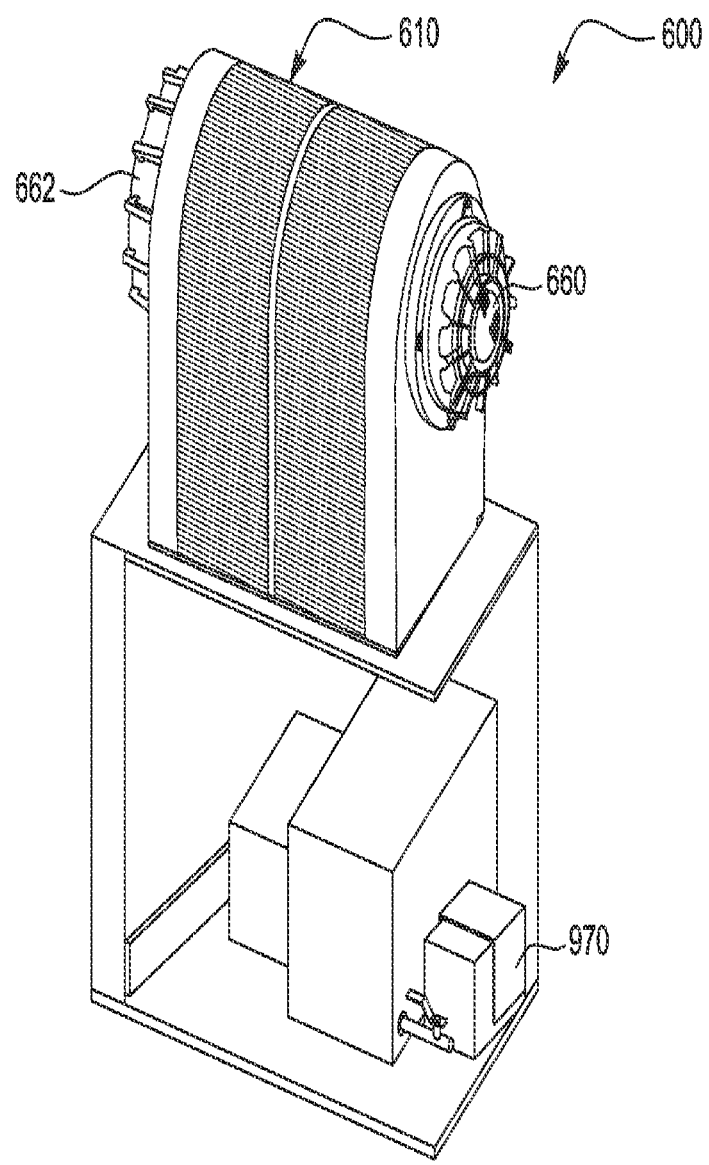
FIG. 15 is another example of the system of FIG. 9.
Figure 16:
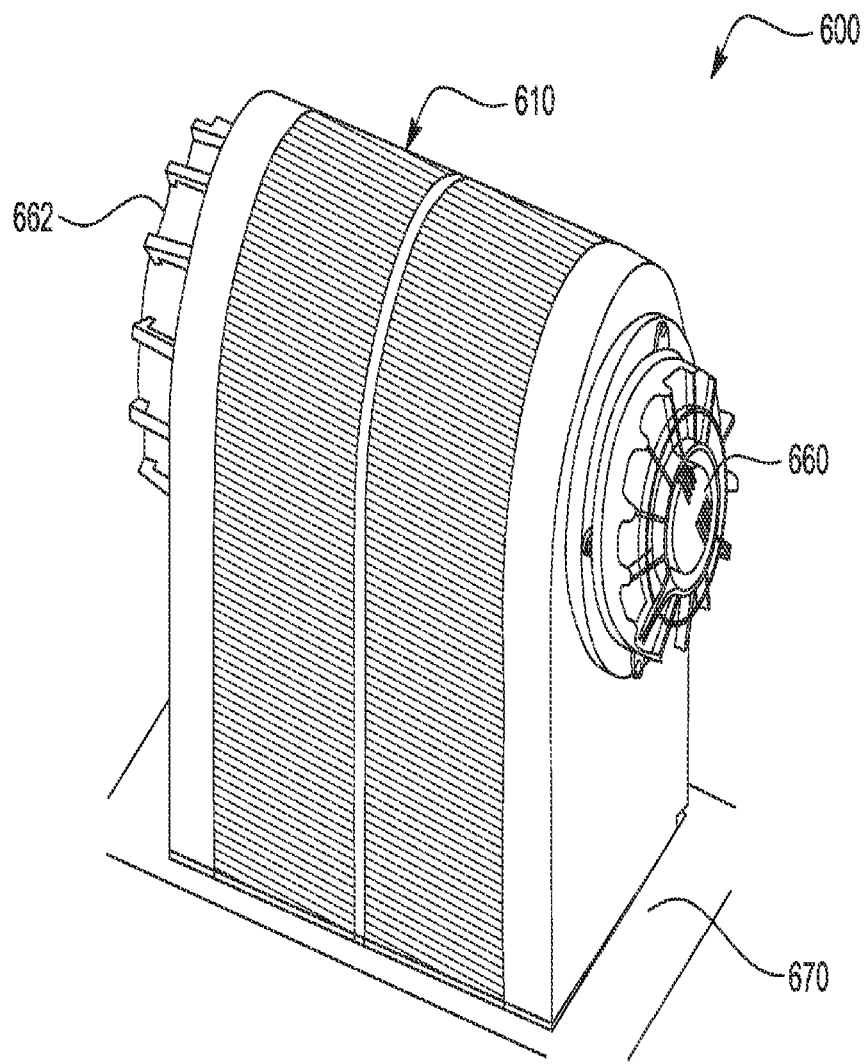
FIG. 16 is a detailed view of the microtube heat exchanger of the system of FIG. 15.

FIGS. 9-16 depict a microtube heat exchanger for a single phase, liquid to air fan system in one aspect of the technology. The microtube heat exchanger is in a "horseshoe shape," with an array of microtubes having a liquid header on each end of the tubes (or maybe we say end plates? Since so much of the text says end plates). Liquid flows through the tubes, the two fans pull or push the air out of the center of the horseshoe, and heat is exchanged from the liquid to the air. For example, cold air may be extracted from the environment by the airflow created by the fans. The cold air may pass through the microtubes in the horseshoe arrangements, transferring heat from the liquid inside the tubes to the air. The fans then pull the hot air out of the center of the heat exchanger. The horseshoe shaped heat exchanger may be used as part of a system as shown in FIGS. 14-16, where the heat exchanger sits atop a cabinet that may include the various components of the environmental control system, as disclosed herein.

Figure 17A:
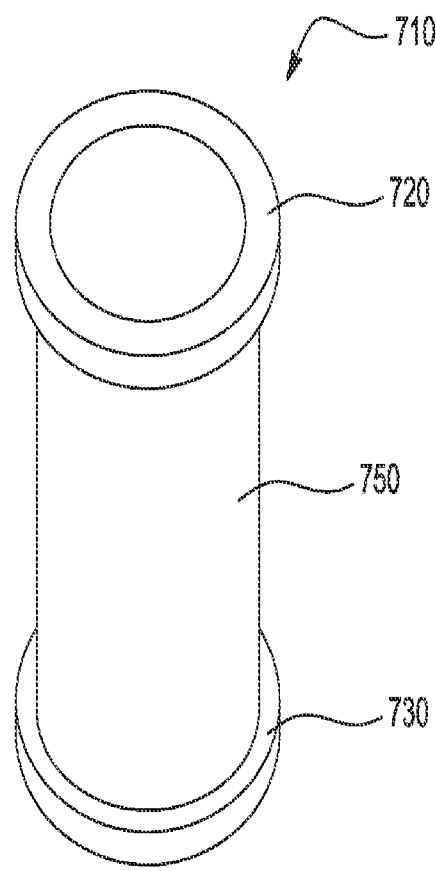
FIG. 17a is a side perspective view of a heat exchanger in accordance with one aspect of the technology.
Figure 17B:
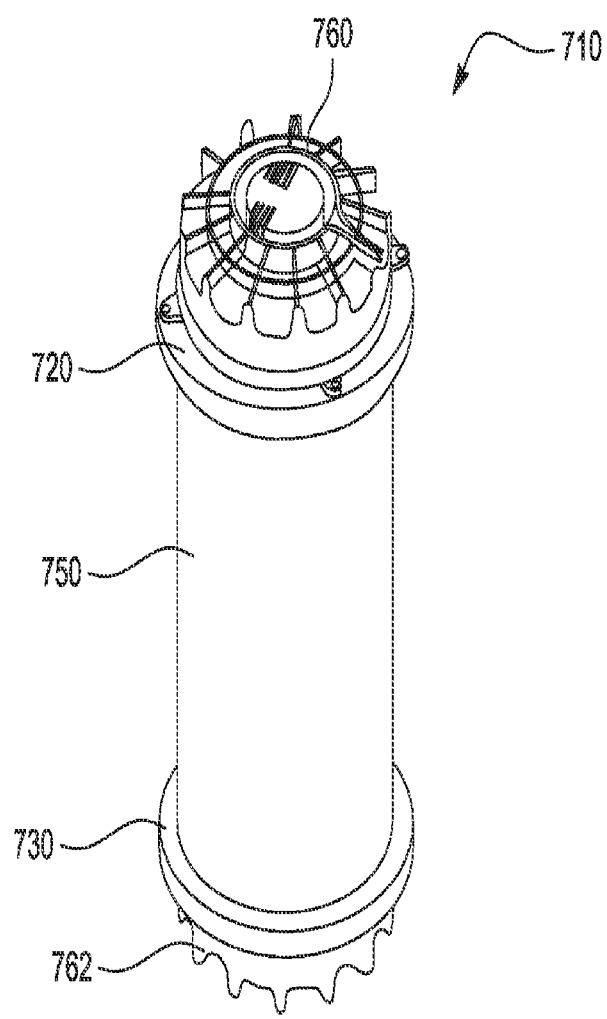
FIG. 17b is a side perspective view of a system incorporating the microtube heat exchanger of FIG. 17a in accordance with one aspect of the technology.

FIGS. 17a-b show a heat exchanger and an air fan setup, respectively, for a liquid to gas heat exchange system using fan induced flow for the gas. The microtube heat exchanger may be a full cylindrical design with an array of microtubes attached at liquid headers on each end of the tubes. In some examples, liquid flows through the tubes for the liquid heat exchange, and a gas flows across the tubes from the forced movement from a fan on each end of the cylinder for the gas heat exchange, as shown in FIG. 17b. The fans can either pull the air out of the center of the heat exchanger, or in some embodiments the fans can push the air into the center of the heat exchanger forcing the gas to expel out of the cylinder across the microtubes and achieve the same result. The operation of the heat exchanger of FIGS. 17a-b is similar to the operation of the horseshoe-shaped heat exchanger discussed above.

Figure 18:
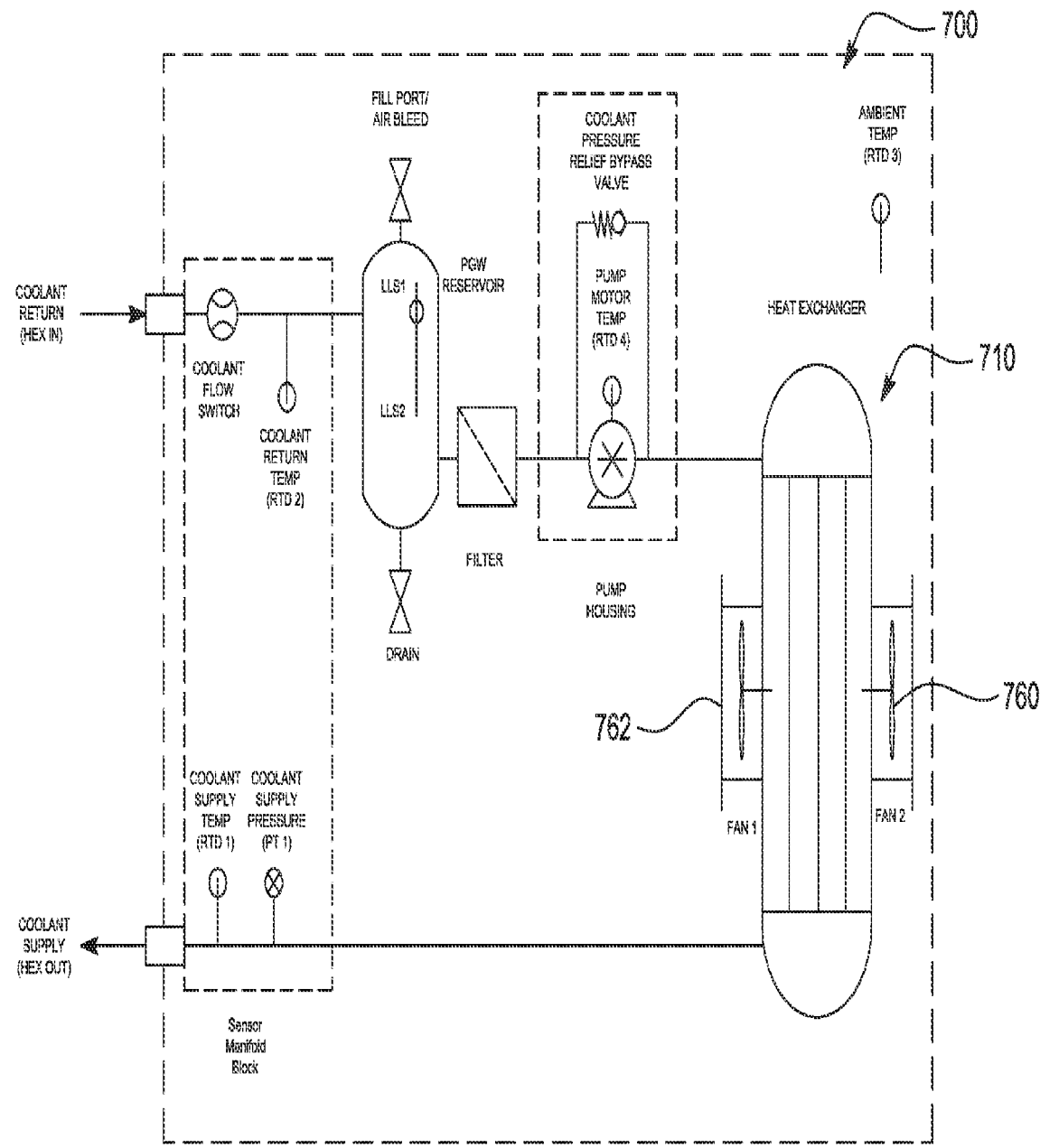
FIG. 18 is a schematic of a system in accordance with one aspect of the technology using the microtube heat exchanger of FIGS. 17a-b.
Figure 19:
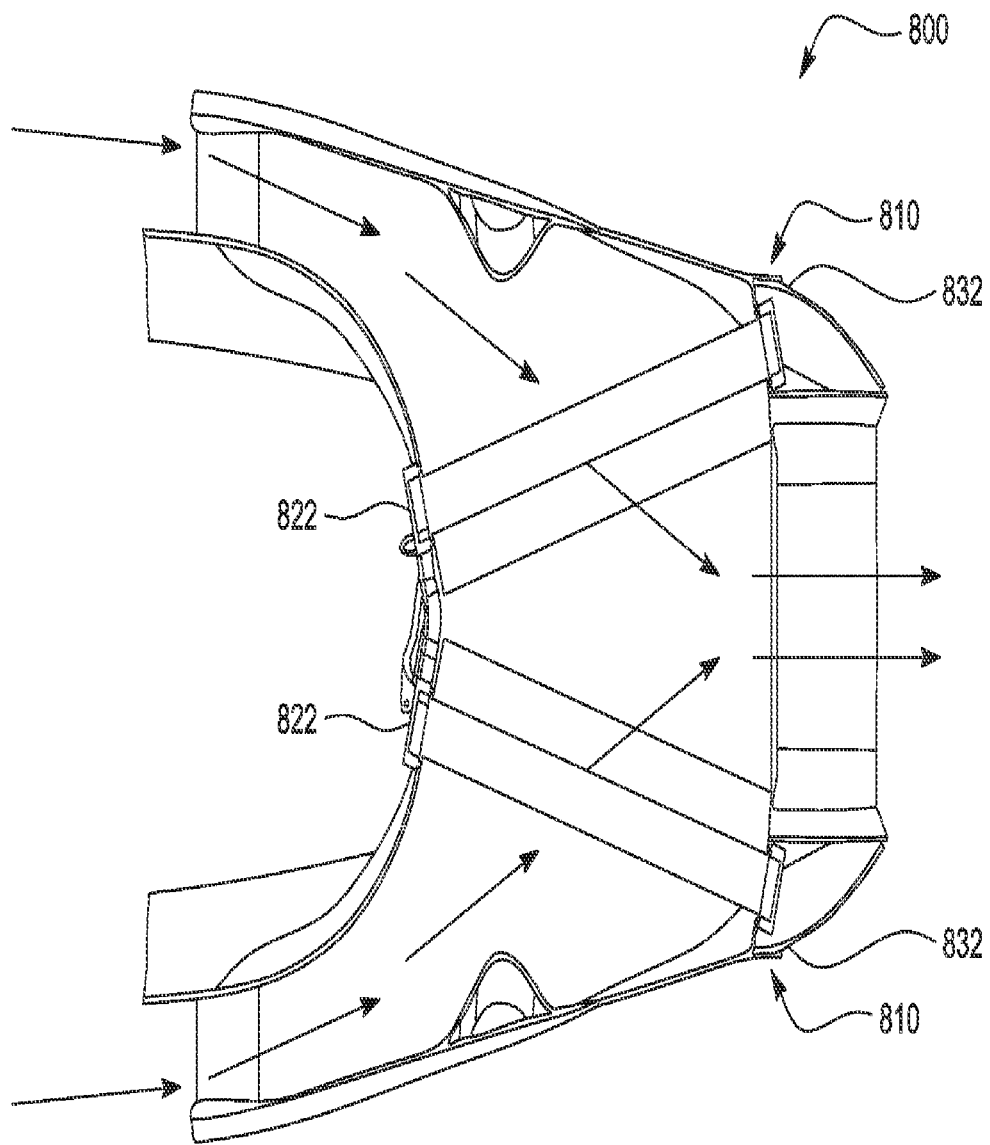
FIG. 19 is a top cross-sectional view of a microtube heat exchanger in accordance with one aspect of the technology.
Figure 20:
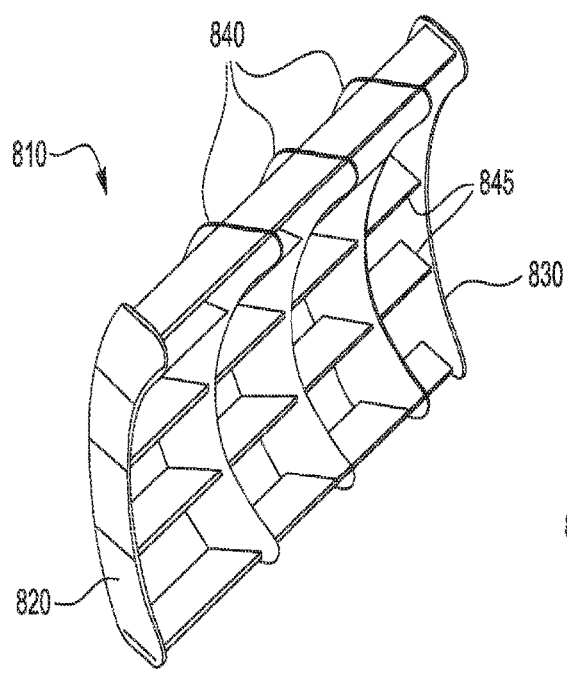
FIG. 20 is an isometric view of the heat exchanger core of FIG. 19.
Figure 21:
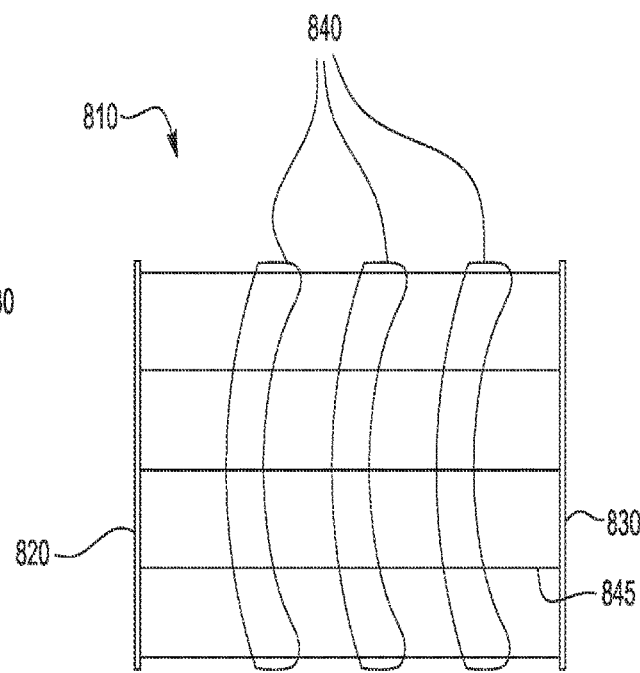
FIG. 21 is a front view of the heat exchanger core of FIG. 19.
Figure 22:
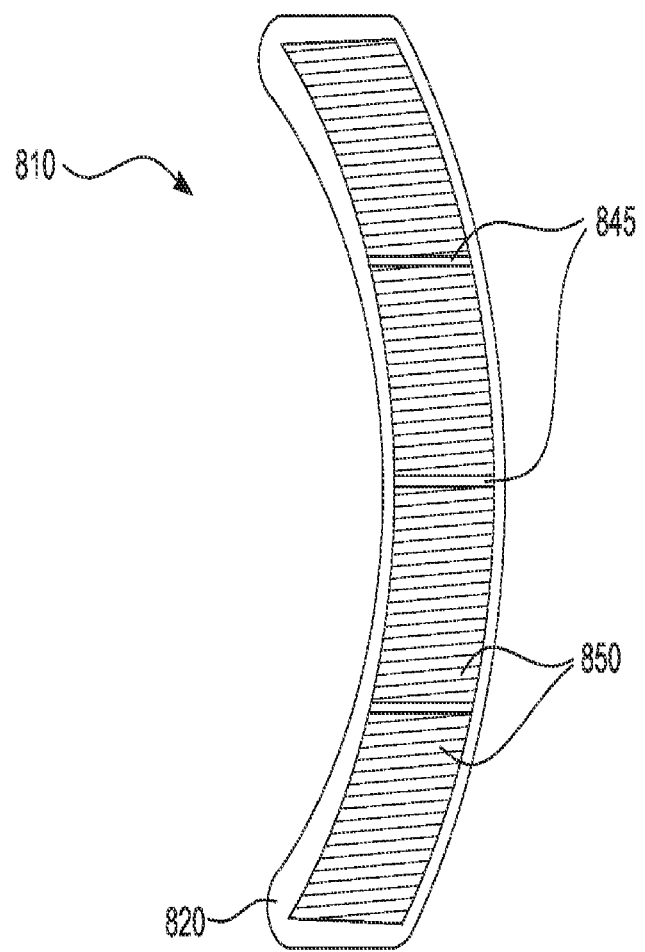
FIG. 22 is a side view of the heat exchanger core of FIG. 19.

FIG. 18 is a schematic for the single phase, liquid to air fan induced system shown in FIG. 17. The airflow induced by the fans cools the hot liquid in the tubes of the heat exchanger. The hot liquid, which may be a coolant, exits the system in its cooled state, and coolant enters the system at the coolant return in its hot state. In some embodiments the liquid can be cool entering into the heat exchanger, and exchange heat with a hot gas entering the cross-flow of the heat exchanger where the liquid exits the heat exchanger hot and the gas exits the heat exchanger cool achieving the same results. In some embodiments the liquid passing through the heat exchanger can be a refrigerant that realizes a phase change, making the liquid a 2-phase circuit such as a refrigerant would react as the liquid instead of a coolant.

FIGS. 19-22 depict a microtube heat exchanger 810 in accordance with aspects of the present invention. The heat exchanger 810 may be used in a single phase cooling system for liquid to air heat exchange based on ram air. The heat exchanger may be used in high velocity applications, such as military jets, including pod applications. The exchanger includes stacks of microtubes 850 arranged as shown in FIG. 22d. The stacks are angled for optimum airflow, and include mid plates 840 or stiffener plates to support the microtubes. In one aspect of the technology, cold RAM air comes in through inlet scoops from forward movement of an aircraft, such as a jet. The air passes across the microtube heat exchanger, which has hot liquid running through the tubes. The cold air cools the hot liquid in the tubes, and hot air exits out the back of the aircraft.

In aspects of the technology, the mid plates 840 can include multiple mid plates. The mid plates may provide structural strength, vibration dampening, or vibration node changing, harmonic vibration altering. In some aspects, the mid plates 840 may be angled mid plates, such that the flow of the fluid passing over the heat exchanger can be directed by the mid plates. For example, in FIGS. 19-21, the mid plates may be angled to force the flow of RAM air that is normal or perpendicular to the long axis of the heat exchanger when it enters the heat exchanger to exit at an angle that is not perpendicular or normal to the long axis of the heat exchanger.

In other aspects of the technology, the mid plates can be used to direct the flow of fluid on the exterior of the head exchanger even without angling the mid plates. For example, in may heat exchange systems, the exterior fluid arrives to the heat exchanger through a duct and exits through a duct. The duct leading to the heat exchanger most often includes a turn, a bend or an angle, such that the fluid arriving to the exterior of the heat exchanger is not uniform, but rather is concentrated on one end while the other end is starved of the fluid based on the ducting. The mid plates or cross plates, though parallel rather than angled, can be staggered in such a way that they direct the exterior fluid to flow more evenly across the heat exchanger. For example, where the exterior fluid is highly concentrated based on the entry ducting, mid plates can be staggered more densely to provide added resistance to flow that will redirect the flow of the exterior fluid to other parts of the heat exchanger.

Figure 23:
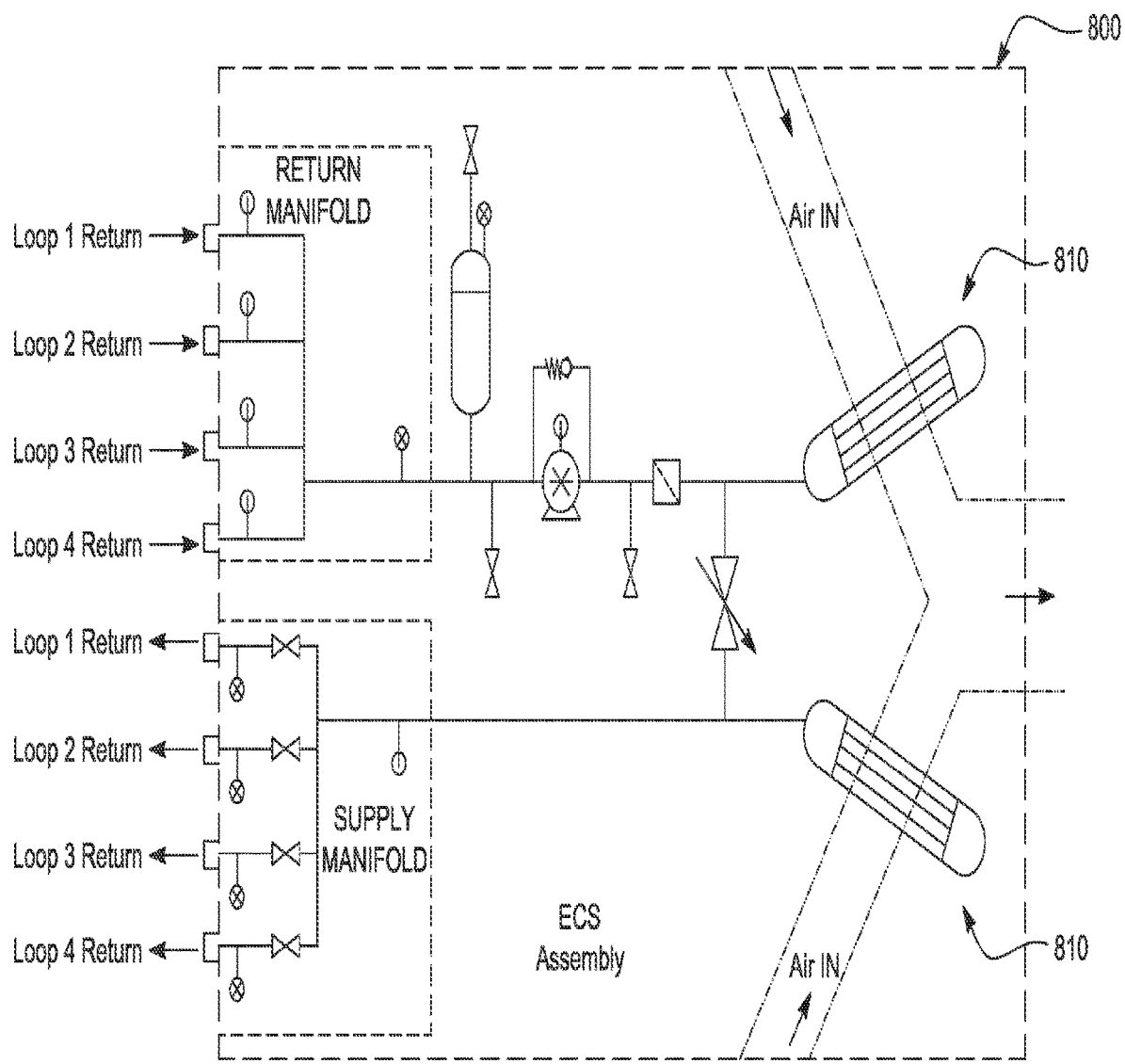
FIG. 23 is a schematic of a system in accordance with one aspect of the technology using the microtube heat exchanger of FIGS. 19-22.

FIG. 23 shows in detail the schematic for a single phase, liquid to air heat exchange system shown in FIG. 1. The system is an example of ram air style heat exchange. In some aspects, the system includes two heat exchangers, each with a separate inlet for ram air, and a single outlet for hot air after heat exchange. In other aspects, other configurations of heat exchangers, inlets and outputs may be used. As discussed herein, the heat exchanger of this system can include microtube heat exchangers. The heat exchangers of FIG. 23 can be the microtube heat exchanger of FIGS. 19-22. In some embodiments the liquid passing through the heat exchanger can be a refrigerant that realizes a phase change, making the microtube heat exchangers a 2-phase circuit such as a refrigerant would react as the liquid instead of a coolant.

Figure 24:
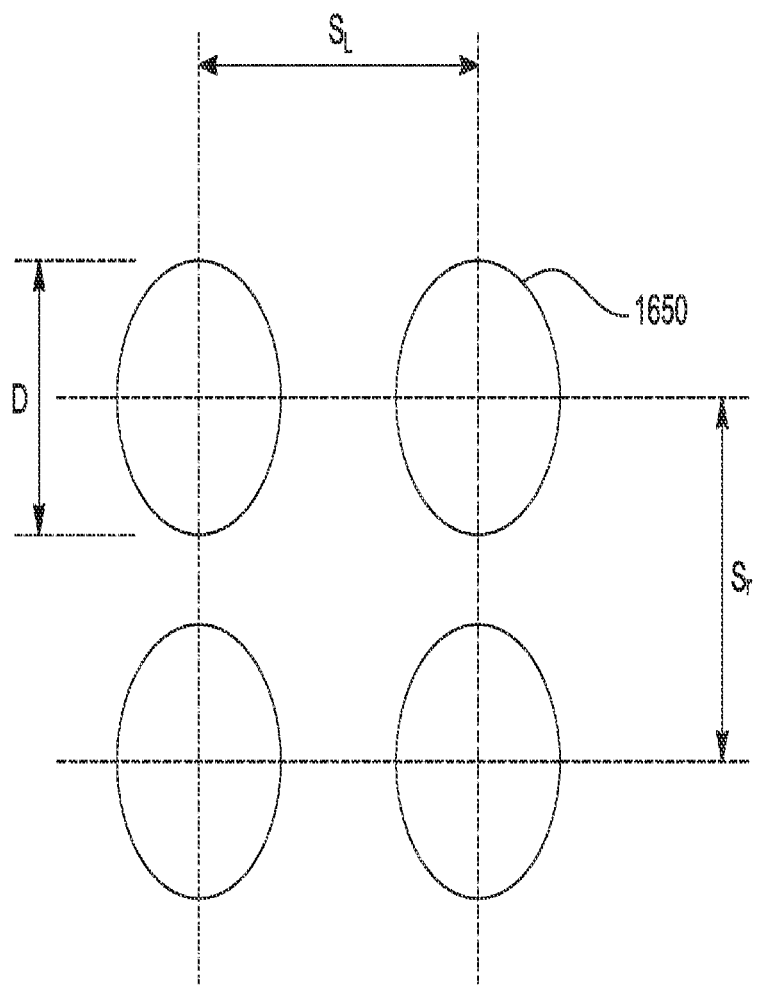
FIG. 24 is a cross-sectional view of an in-line arrangement of microtubes in accordance with one aspect of the present technology.
Figure 25:
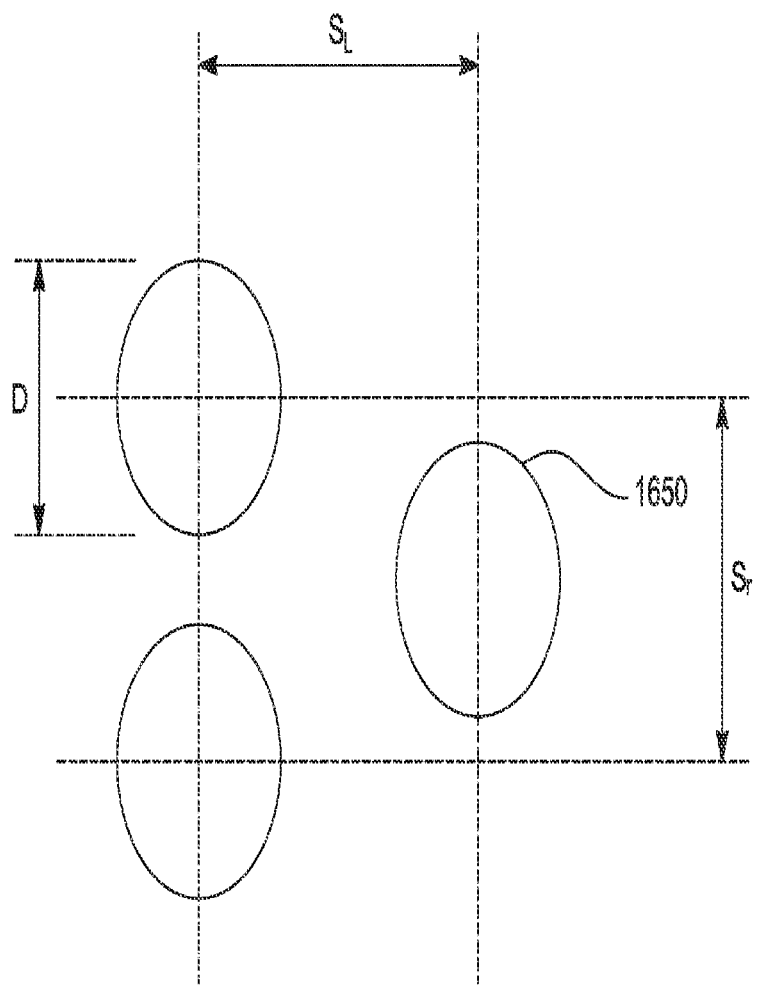
FIG. 25 is a cross-sectional view of an offset arrangement of microtubes in accordance with another aspect of the present technology.

FIGS. 24-25 show examples of arrangements of the microtubes 1650 of the heat exchanger of the present technology. In some examples, the microtubes are arranged "in-line" as shown in FIG. 24. In other examples, the microtubes are arranged in a "staggered" formation as shown in FIG. 25. Choice of in-line or staggered is dependent upon shell-side (outside of tubes) fluid properties, primarily driven by fluid Prandtl number. In-line banks are chosen for low Prandtl numbers (air for example), staggered is chosen for high Prandtl number fluids (liquid coolants, oils, etc.).

The diameter of each microtube, or the tube size, is driven by tube-side (inside the tubes) fluid properties. In general, smaller tube size results in more efficient heat transfer, however minimum size is limited by pressure drop properties of the fluid passing through the inside of the tubes. In some aspects, a 0.022" OD, 0.002" wall thickness tube may be standard for most coolants (PAO, EGW, PGW, water) and refrigerants (R134a, R22, R404c, etc.). For higher viscosity fluids (turbine engine oils, transmission oils, gearbox oils, etc.) a 0.0355" OD tube with 0.002" wall thickness may be desirable. This larger diameter allows for an acceptable pressure drop with the more viscous fluids.

In choosing an arrangement of microtubes, tube spacing or the distance between each microtube is chosen for each application. In many applications, tube spacing is used to optimize the performance of the microtube heat exchanger. Spacing is often tailored to particular applications depending on fluid type, flow rates, pressure drop vs. size trades, pressure drop limitations, size limitations, etc. However, some standards are desirable in some situations. For example, tube longitudinal and transverse spacing is defined by $S_L$ and $S_T$ parameters respectively, which are ratios of tube spacing (center to center) to tube diameter D. Longitudinal is parallel to fluid flow while transverse is normal to fluid flow. In some examples, the standard spacing for in-line tube arrangements is a ration of D to $S_L$ of 1.25 and a ration of D to $S_T$ of 2.75. For staggered arrangements of microtubes, the standard ratios can be, respectively, 1.3 and 1.5. Nevertheless, as discussed in more detail herein, the ratios may be anywhere between 1.01 and 4.0, or higher, depending on the specific applications.

Tube wall thickness is driven by environmental and operational requirements. From a thermal performance perspective, the goal is to have the thinnest wall possible as this this minimizes conductive thermal resistance. In some examples of the present technology, a typical wall thickness for the microtubes in heat exchangers is 0.002".

When driven by high pressure applications (>1000 psig), thicker wall is required. When severe foreign object debris (also known as FOD) or sand/dust requirements are applied, several rows on the inlet side of the heat exchanger are sized with thicker walls to resist damage due to particle impact.

Figure 26:
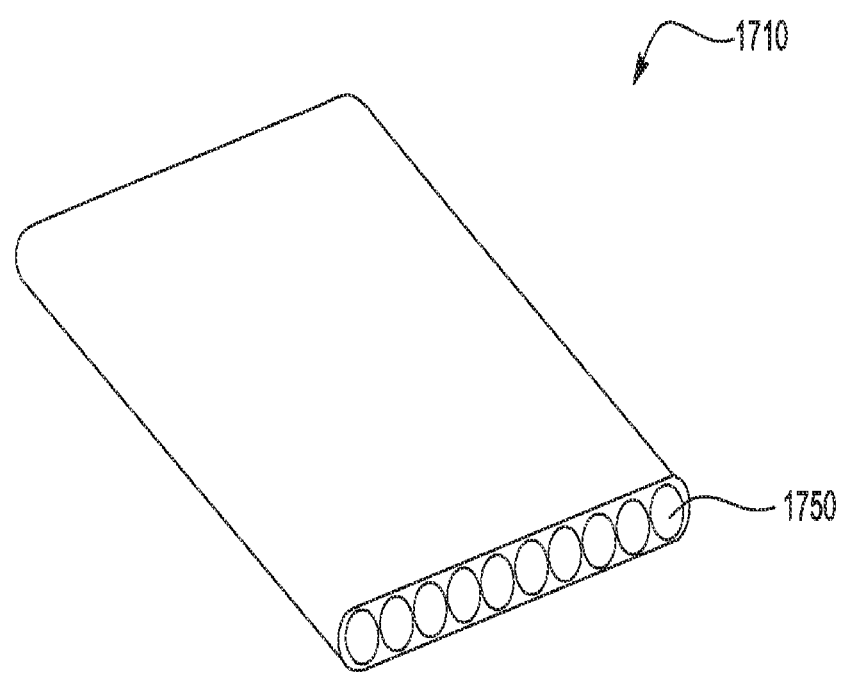
FIG. 26 is a perspective view of a sheet of microtubes according to one aspect of the technology.

In yet other examples of the present technology, an array of microtubes 1710 for a heat exchanger core may form a sheet of microtubes 1750, as depicted in FIG. 26. The sheet of microtubes 1750 may have nearly the same outside surface area as an array of microtubes, while retaining some benefits. In such examples, an end plate may include an array of slots the size of the sheets, rather than much smaller and greater number of openings for each microtube. Such an arrangement may further optimize the laser welding process. A heat exchanger incorporating a sheet of microtubes may also direct the travel of fluid on the outside of the heat exchanger with greater consistency.

Figure 27:
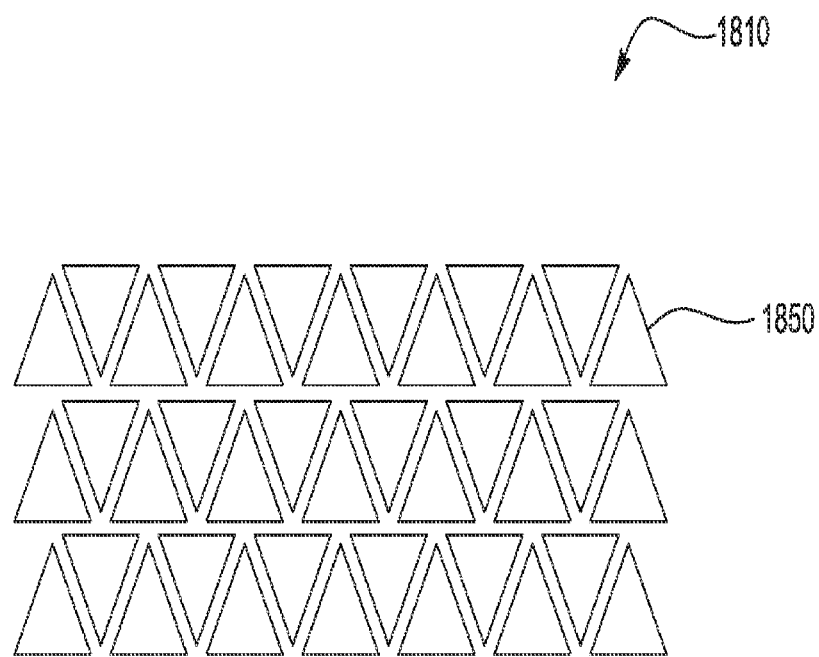
FIG. 27 is a cross-sectional view of another arrangement of microtubes within a microtube heat exchanger according to one aspect of the present technology.
Figure 28:
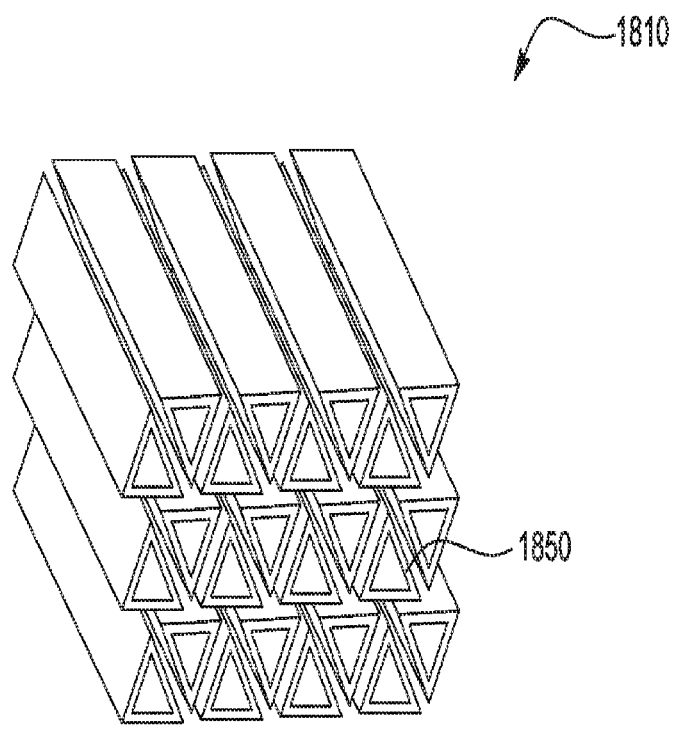
FIG. 28 is a perspective view of the microtubes within a microtube heat exchanger of FIG. 27.

FIGS. 27-28 depict another example of an array of microtubes 1850 for heat exchanger core 1810 in accordance with the present technology. The microtubes 1850 may have a triangular cross-section. Yet other examples will be understood to apply to the present technology, including square or rectangular cross sections of microtubes, or any form of oval or elliptical cross-sectional shape.

Figure 29:
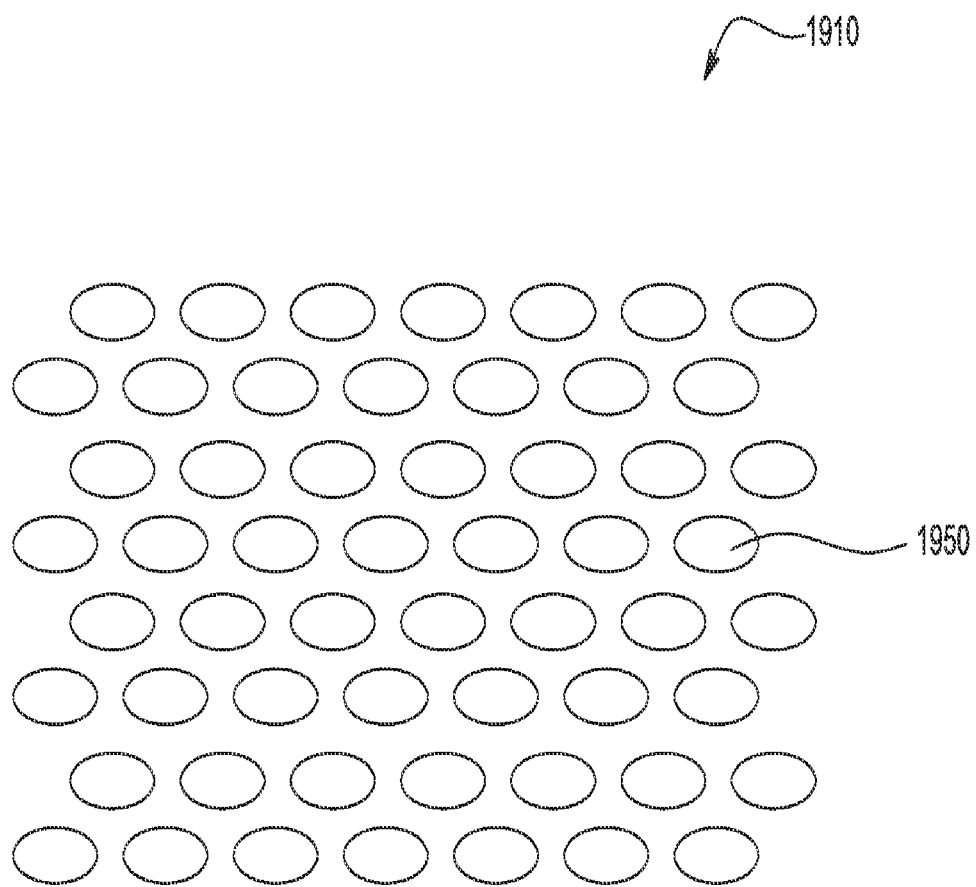
FIG. 29 is a cross-sectional view of another arrangement of microtubes according to an aspect of the present technology.
Figure 30:
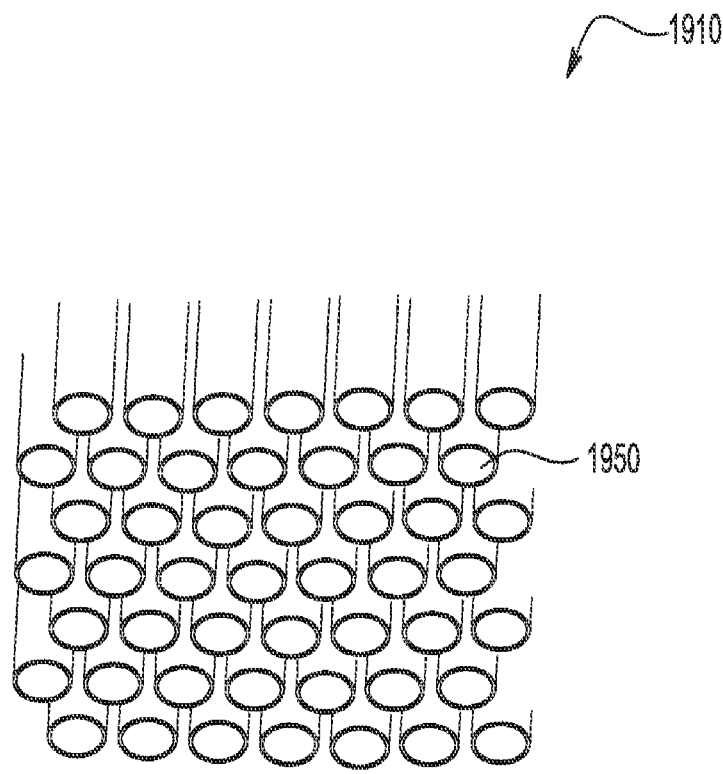
FIG. 30 is a perspective view of the microtubes of FIG. 29.
Figure 31:
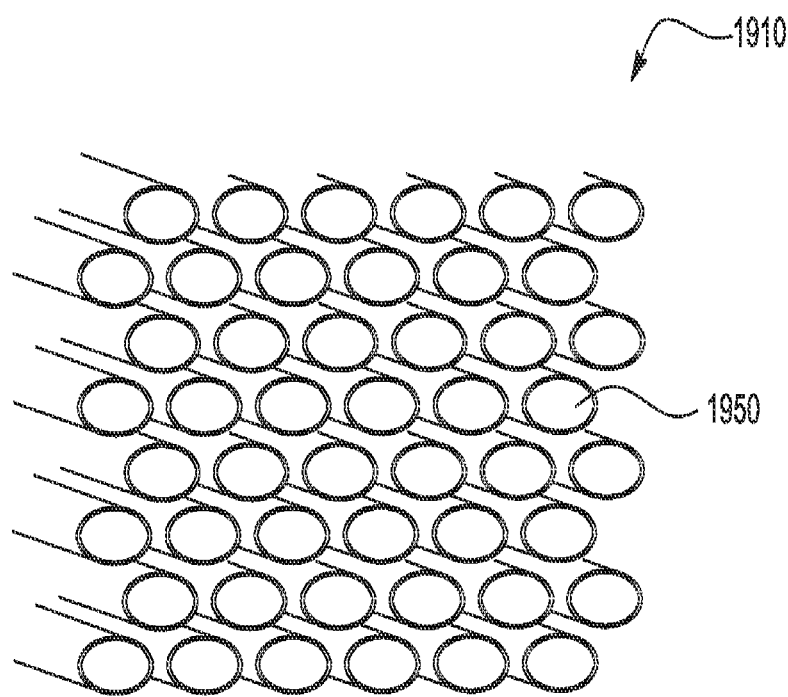
FIG. 31 is another perspective view of the microtubes of FIG. 29.
Figure 32:
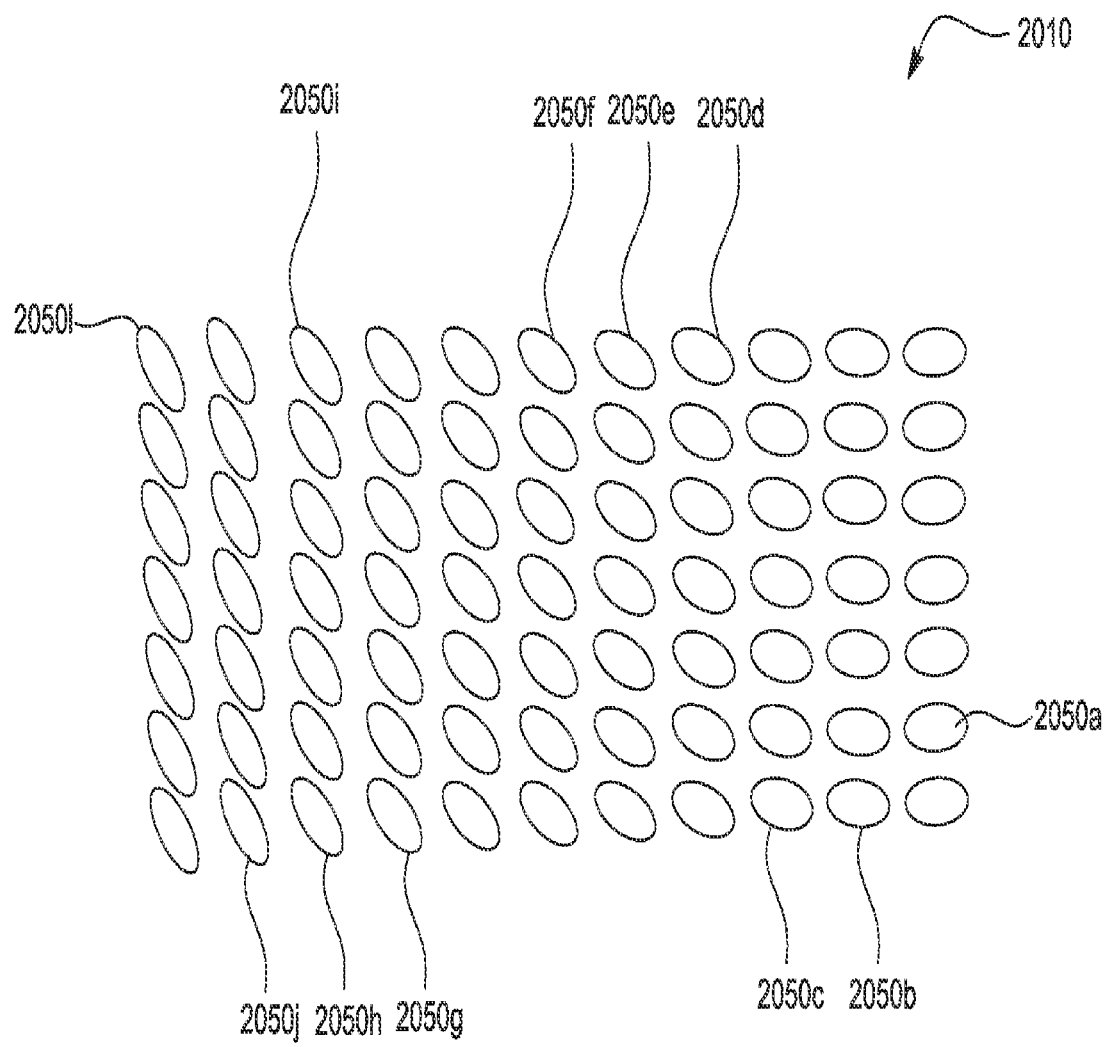
FIG. 32 is a cross-sectional view of an arrangement of microtubes in accordance with another aspect of the present technology.
Figure 33:
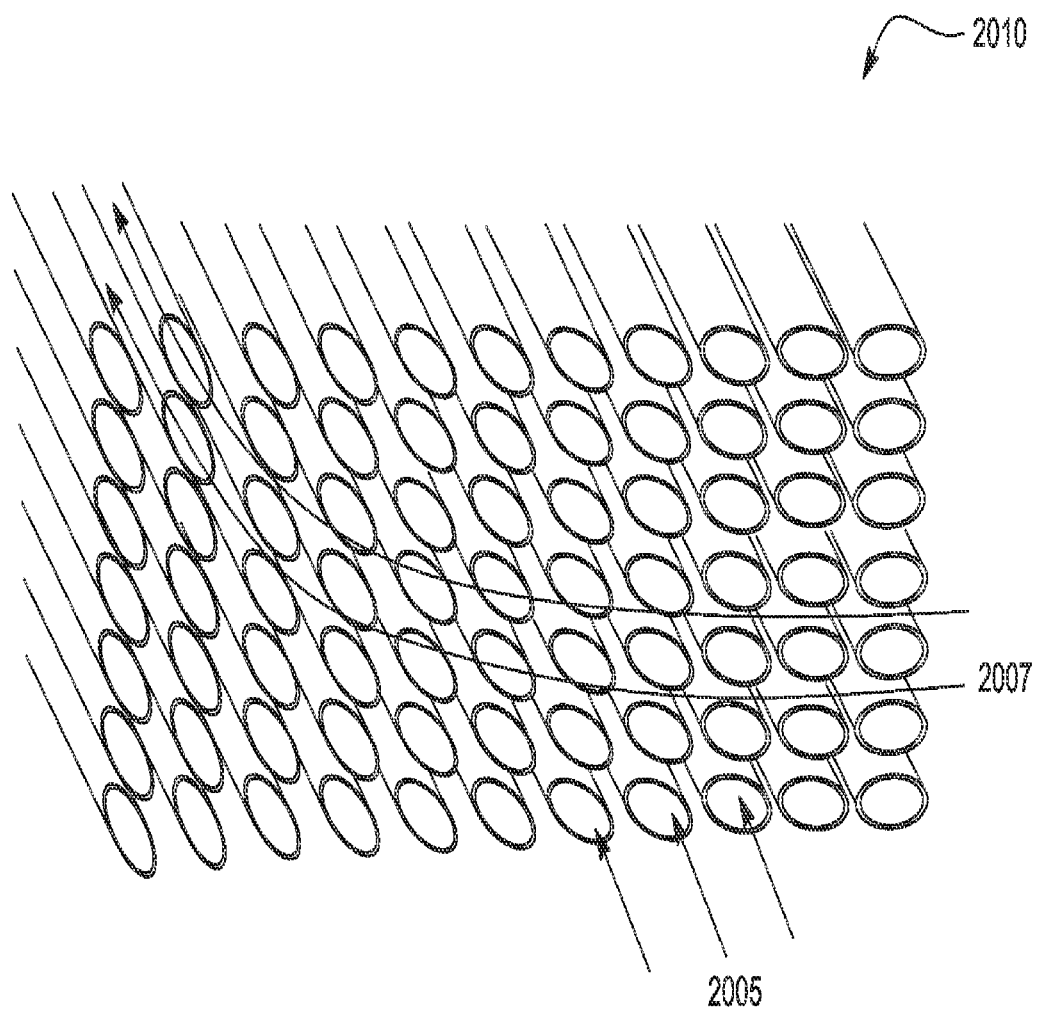
FIG. 33 is a perspective view of the arrangement of microtubes of FIG. 32 with and illustration of how the varying angle can change the direction of the cross flow fluid.

FIGS. 29-31 depicts another example of an array of microtubes 1950 for a microtube heat exchanger core 1910 according to the present technology. The microtubes 1950 can include an elliptical cross-sectional shape and be formed in a staggered or offset configuration.

In yet other examples, the microtube array according to the present technology can include an arrangement whereby the microtubes are offset such that they direct the flow of the fluid on the outside of the heat exchanger. For example, whether circular, rectangular, square, triangular, oval, or elliptical cross-sections of tubes are used, rows of microtubes may be gradually offset to direct the flow of the fluid in one direction or another.

Figure 36:
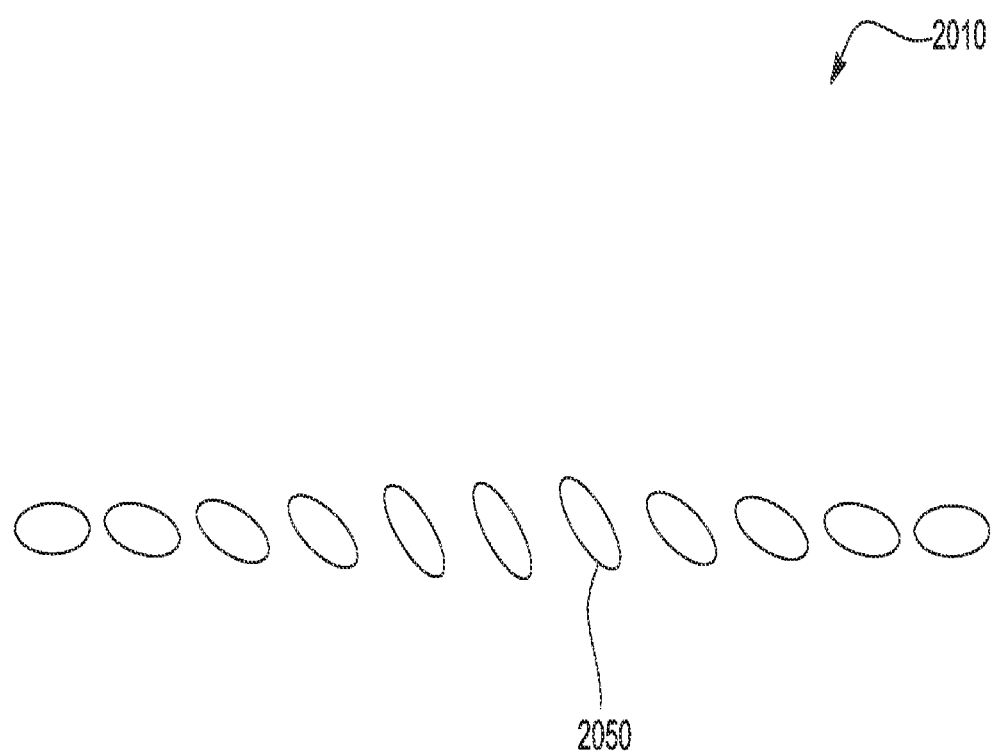
FIG. 36 is another chart illustrating the arrangement of microtubes of FIG. 32.

As shown in FIGS. 32-36, elliptical microtubes 2050 can be used in flow persuasion, flow directing, or flow biasing to control the direction of the flow of the fluid 2007 on the outside of the heat exchanger 2010. For example, the angle of orientation of each new column of microtubes 2050 may be offset by an additional five degrees as shown in FIGS. 35-36, where column of microtubes 2050a is flat, column of microtubes 2050b is angled up at 5 degrees, column of microtubes 2050c is angled up at 10 degrees, and so on through column of microtubes 2050l. In this configuration, flow of fluid over the microtube heat exchanger, as shown in FIG. 34, will be directed, biased or persuaded in a specific direction. In some examples, such an arrangement of microtubes can be used to have a heat exchanger that must fit a certain footprint but where the flow of the fluid on the outside of the heat exchanger is directed in an orientation that is not strictly normal to the heat exchanger.

Figure 37:
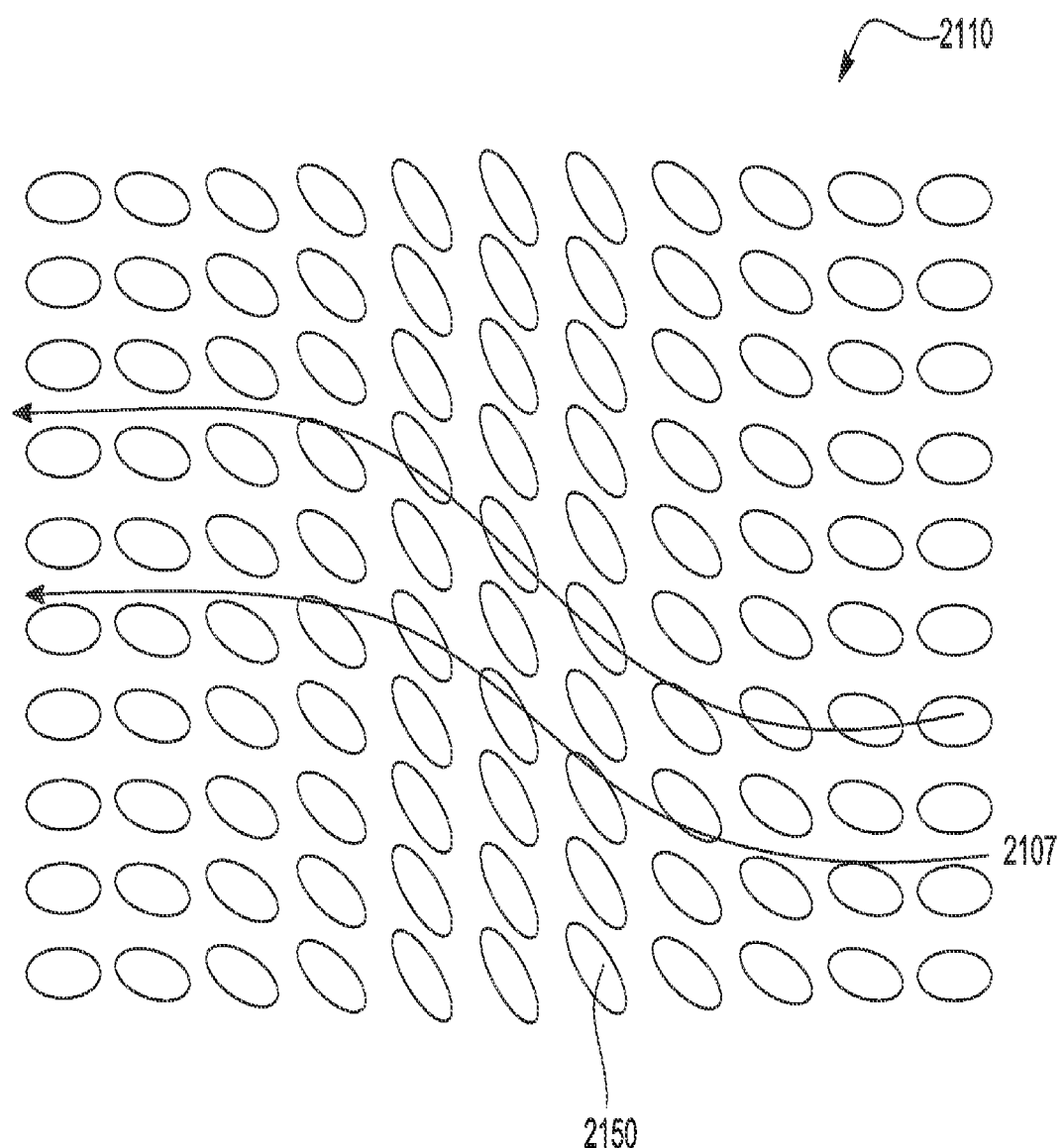
FIG. 37 is a cross-sectional view of yet another arrangement of microtubes according to aspects of the technology.

In yet other examples, as shown in FIG. 37, the flow of the fluid 2107 on the outside of the heat exchanger 2110 can be directed in multiple directions by microtubes 2150 having oval cross-sections, for example gradually upward and then gradually back in a normal direction. As will be understood based on this presentation of the technology, any arrangement of the direction of flow of external fluid that would otherwise be normal to the flow of internal fluid can be achieved through such an arrangement of the array of microtubes.

Figure 38:
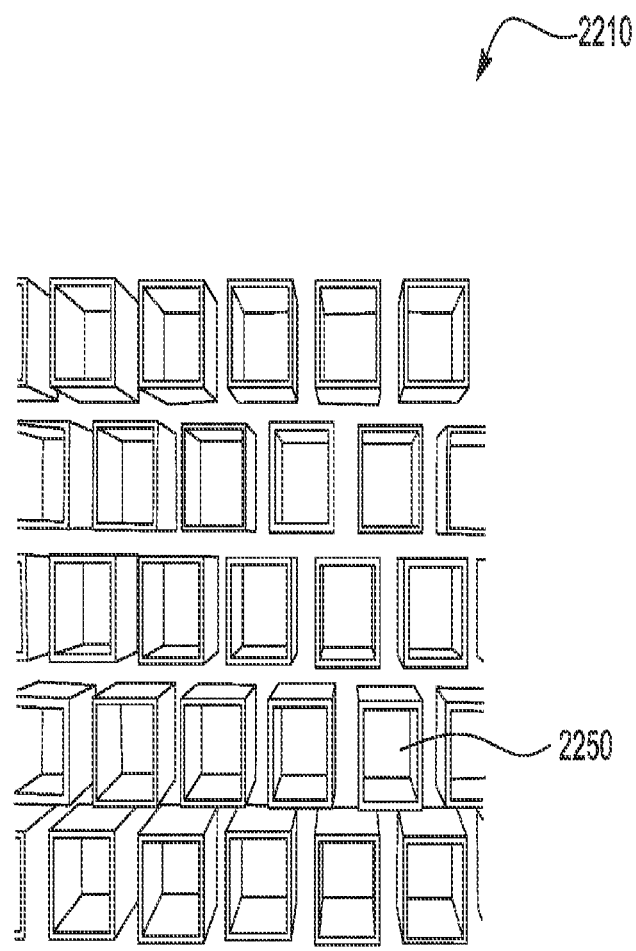
FIG. 38 is a cross-sectional view of an arrangement of microtubes according to other aspects of the technology.
Figure 39:
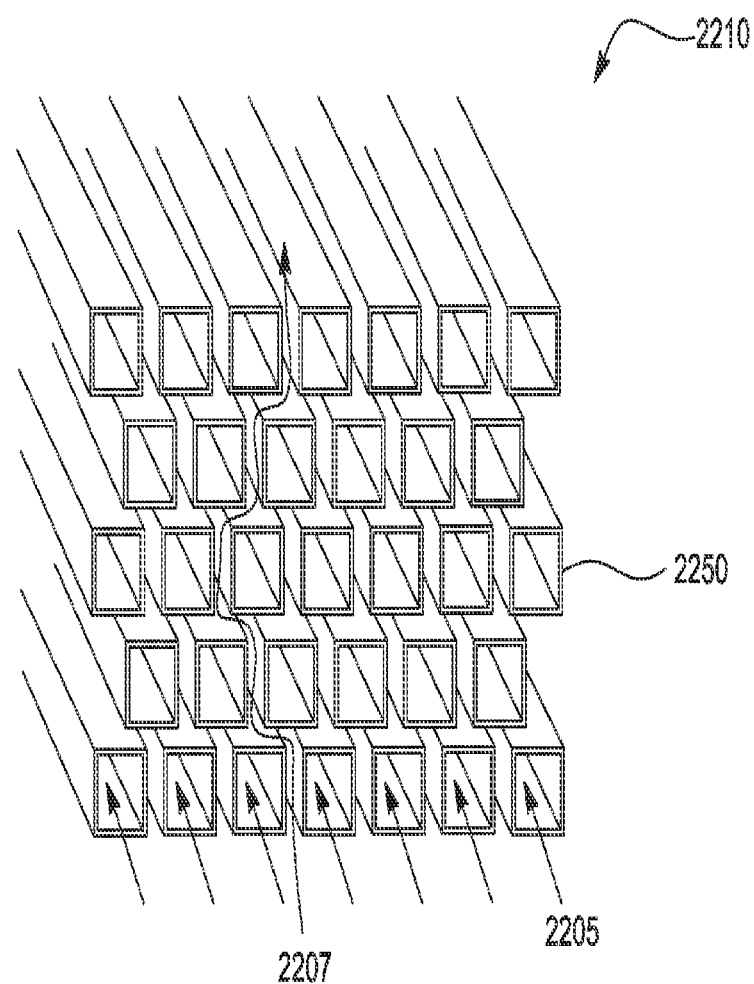
FIG. 39 is a perspective view of the microtubes of FIG. 38.

FIGS. 38-39 show an array of microtubes 2250 for a heat exchanger core 2210 having square cross-sectional shapes according to some aspects of the present technology. The microtubes 2250 may be arranged in either aligned arrangements (not shown) or staggered arrangements as shown in FIGS. 24-25. The arrangement of microtubes having a square shape may be used to direct airflow over the heat exchanger. For example, in some embodiments, the square shape and the ratios of the cross-sectional size to the spacing may be selected to produce the desired air flow across the heat exchanger. In some embodiments, the square cross section may be used to slow the flow of the exterior fluid according to the heat transfer needs of a particular application. In yet other examples, the microtubes may be angled, as discussed with reference to FIGS. 32-37, to direct or bias the flow of the exterior fluid into certain paths.

Figure 40A:
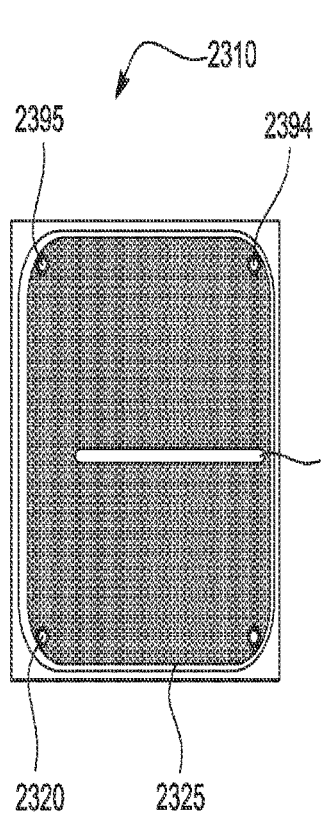
FIG. 40a is an end view of a microtube heat exchanger core according to other aspects of the technology.
Figure 40B:
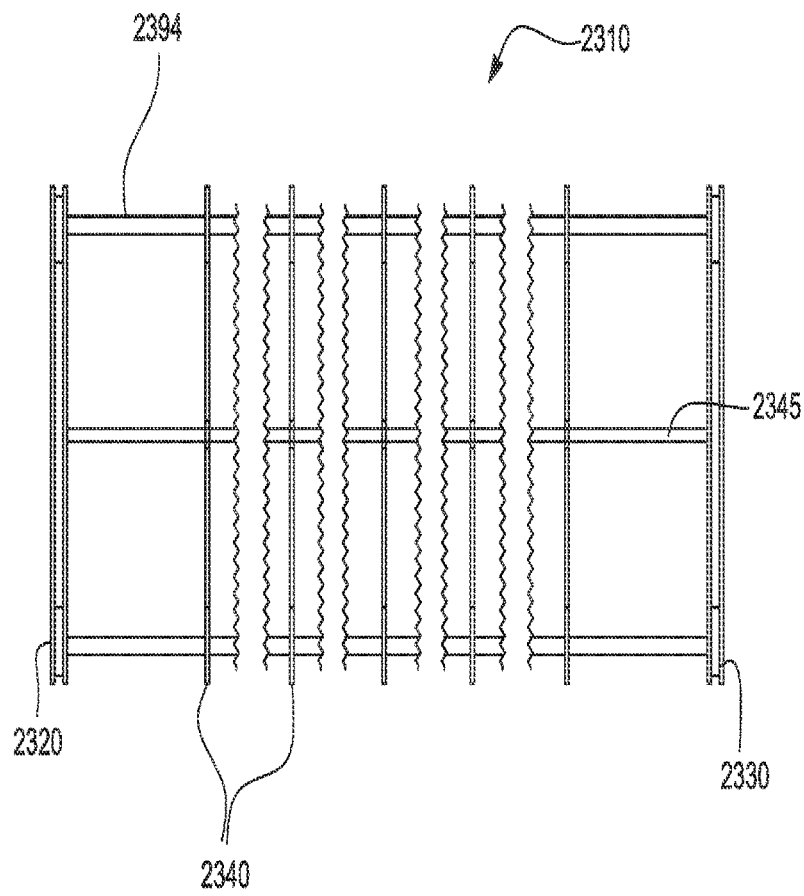
Figure 40C:
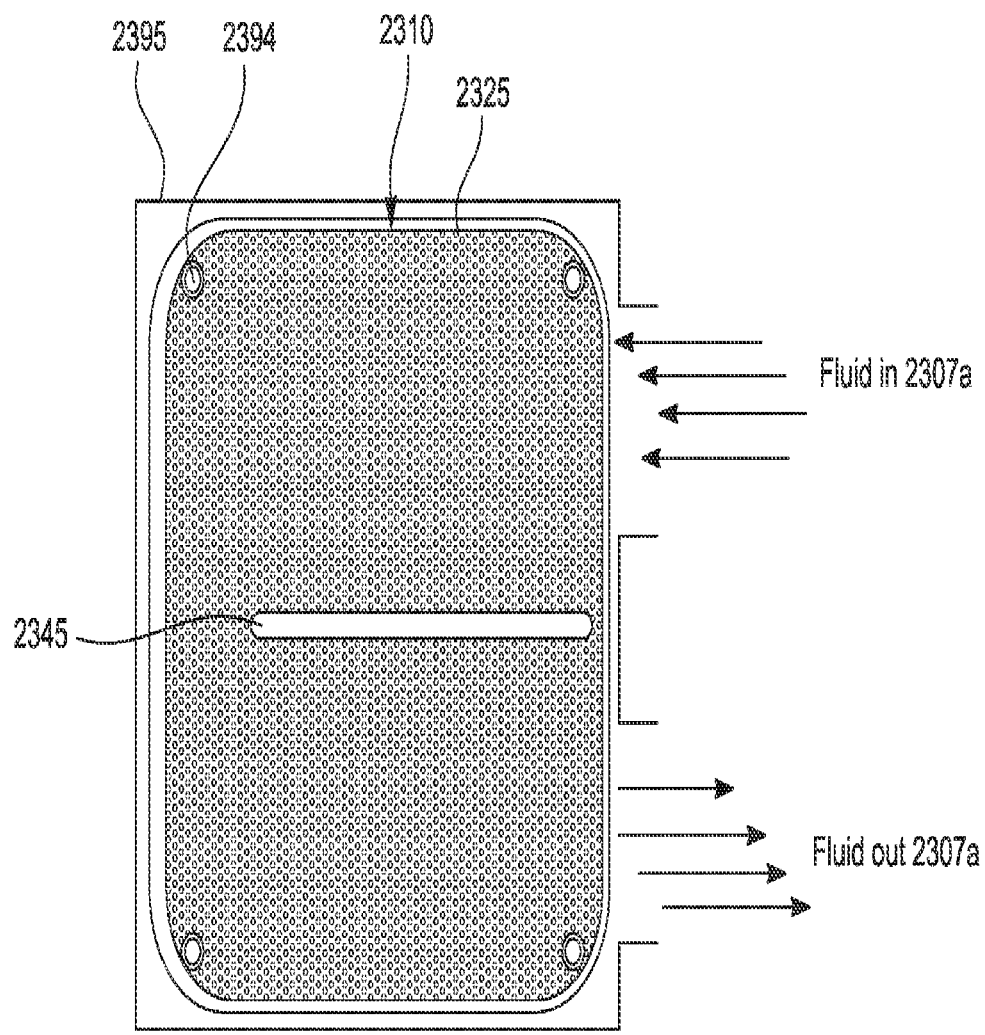

FIGS. 40a-c depict another microtube heat exchanger 2310 according to aspects of the technology that include a multi-pass or cross-flow configuration. A shield, fin, or blocking plate 2345 is positioned in the heat exchanger to force the exterior fluid 2307 into a torturous path of flow. For example, a single blocking plate 2345 may extend partially through the center of the heat exchanger, parallel to the microtubes. The exterior fluid may enter on one side of the blocking plate 2307a and the plate will prevent the exterior fluid from flowing to the other side of the blocking plate until it has travelled through the desired path, around the blocking plate, and exiting the heat exchanger core on the opposite site of the blocking plate 2307b. In other examples, the blocking plate may be used to direct the flow into any desired path, and may include exiting the microtube heat exchanger core on the same side as the entrance, on the opposite side, or on either end of the heat exchanger core.

In aspects of the technology, the cross flow or multi-pass configuration provides the benefit of increased efficiency, especially for refrigerant style, liquid cross flow. Giving the cross flow more time, and making sure it reaches all areas of the heat exchanger core, can significantly increase the heat exchange efficiency.

Figure 41:
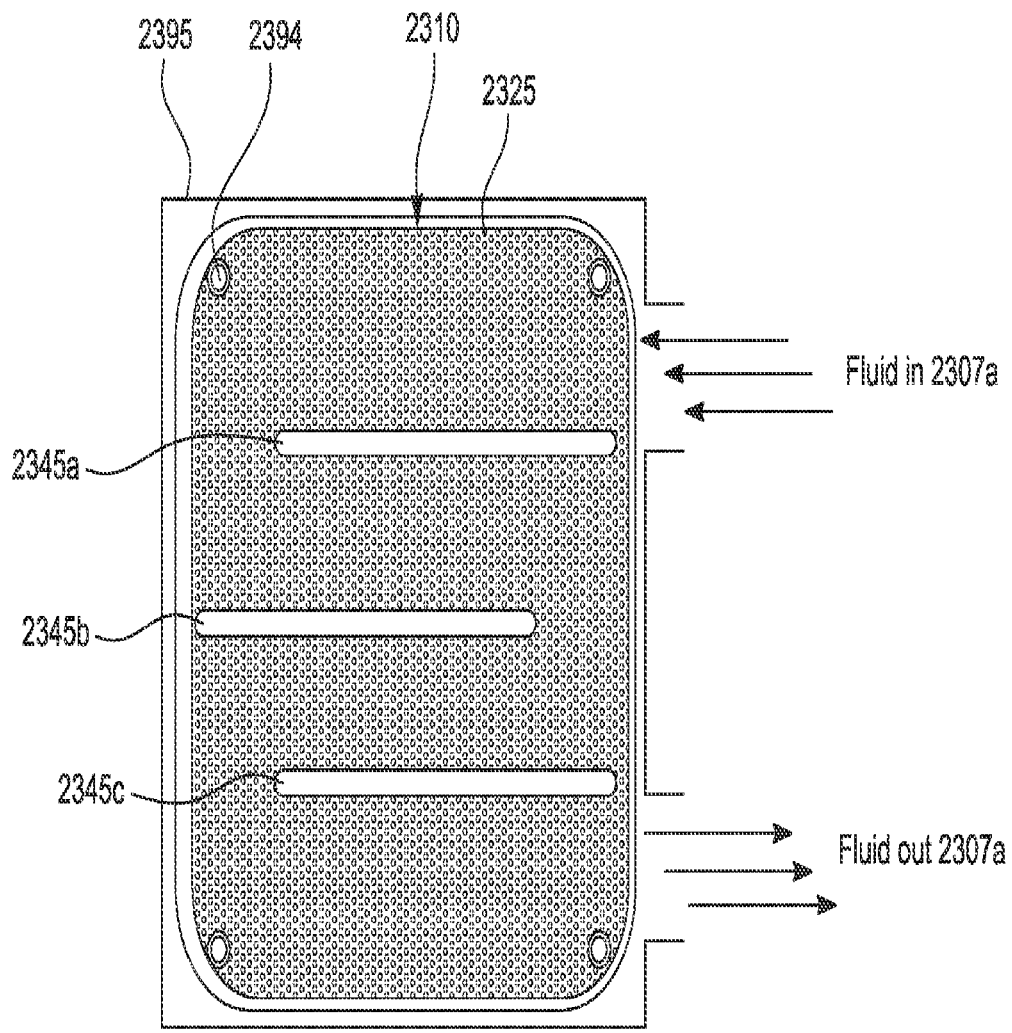
FIG. 41 is an end view of another microtube heat exchanger core according to aspects of the technology.

FIG. 41 shows yet another example of a multi-pass or cross flow configuration, where three blocking plates 2345a, 2345b, and 2345c are used to induce a torturous path of exterior flow 2307 through the heat exchanger core 2310. It will be understood that other variations of blocking plates can be used to create any cross flow or multi-pass desired for any configuration.

Figures 42A, 42B:
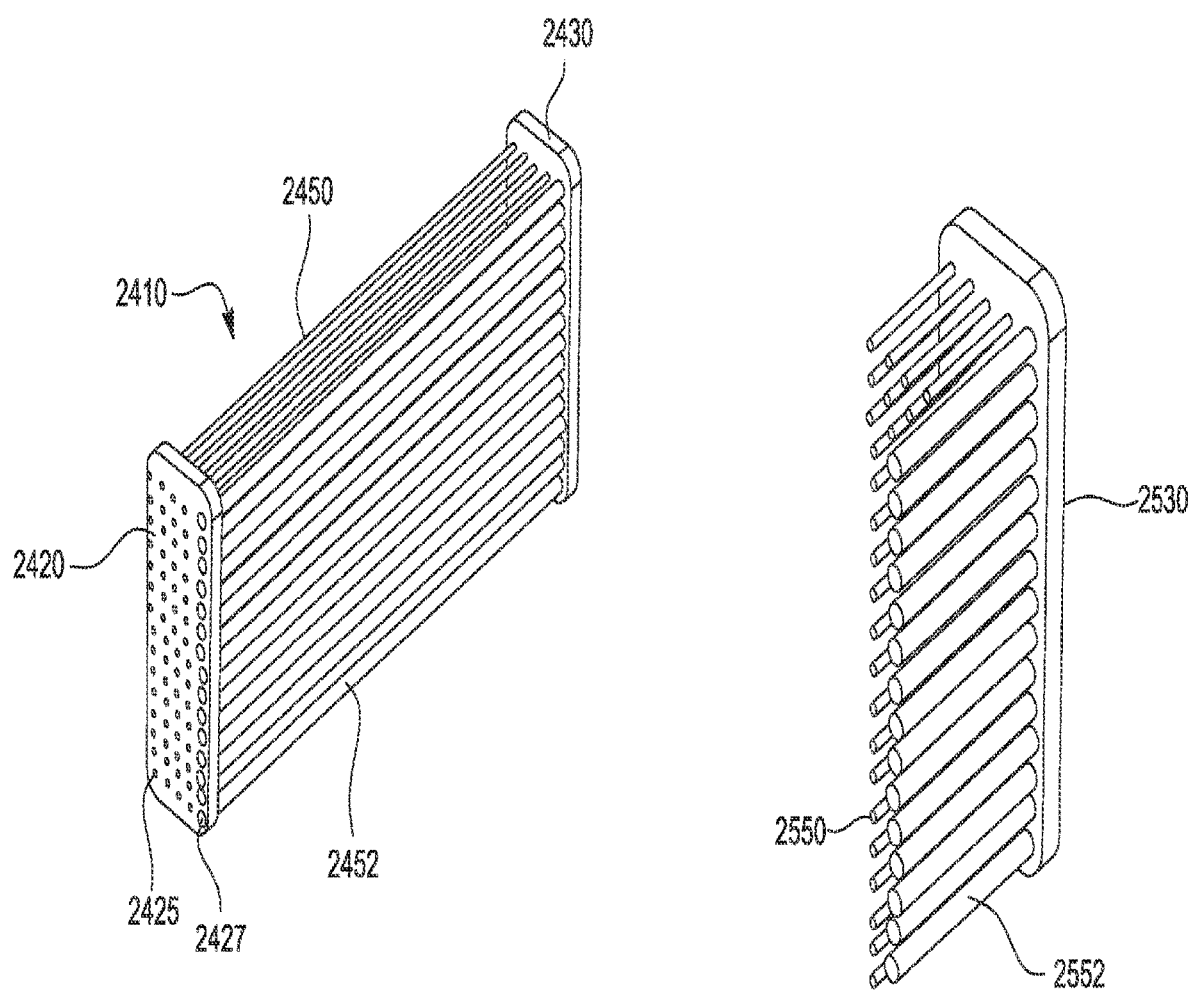
Figures 43A, 43B:
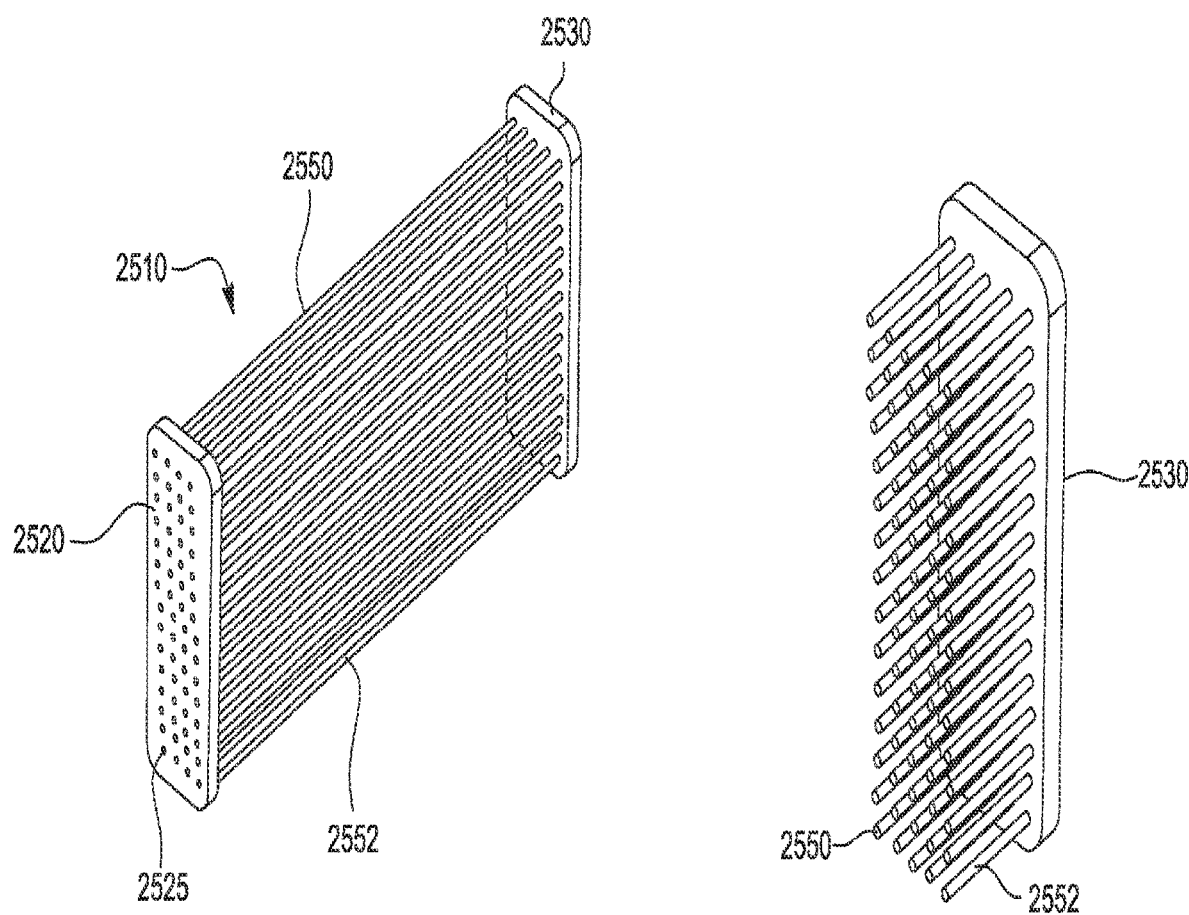

FIGS. 42-43 depict microtube heat exchanger cores according to the present technology that include integrated foreign object debris or foreign object damage (FOD) protection. In some aspects of the technology, ram airflow is employed for heat exchange, as described herein. Fans are not used to induce air flow, but rather the heat exchanger is placed in a portion of an aircraft, such as a scoop, where air flows due to the travel of the aircraft. In such arrangements, foreign objects such as rocks, pebbles, birds or other floating or flying objects cause concern over FOD. Rather than employing a separate FOD shield, the heat exchanger of the present technology can be modified to include integrated FOD protection. For example, as shown in FIG. 42, a front row of tubes that face the free stream air can be thicker walled and or have a larger diameter. This robust front wall can act like a blockade for the FOD, while all the tubes behind the front wall are maximum efficiency microtubes. In some aspects of the technology, the robust tubes can be hollow (FIG. 42b) to continue to provide some heat exchange, or can be solid (FIG. 43b) to provide a more robust barrier and to prevent any leakage within the system should FOD caused damage to a microtube. In yet other examples, the reinforced microtube could have the same diameter as the remaining microtubes, while having a thicker wall, and consequently thinner opening.

With specific reference to FIGS. 42a-b, a microtube heat exchanger core 2410 includes a first end plate 2420 and a second end plate 2430, each with an array of openings 2425. A corresponding array of microtubes 2450 are arranged and inserted into the array of openings 2425. For simplicity, only a small number of openings and microtubes are shown, while in application, the microtubes and openings would be much greater in number and much closer together. The microtubes may include standard microtubes 2450 as discussed herein, and reinforced microtubes 2452 for FOD protection. The reinforced microtubes 2452 may include microtubes of a larger diameter and a greater thickness that provide the required strength for FOD protection.

Figure 43C:
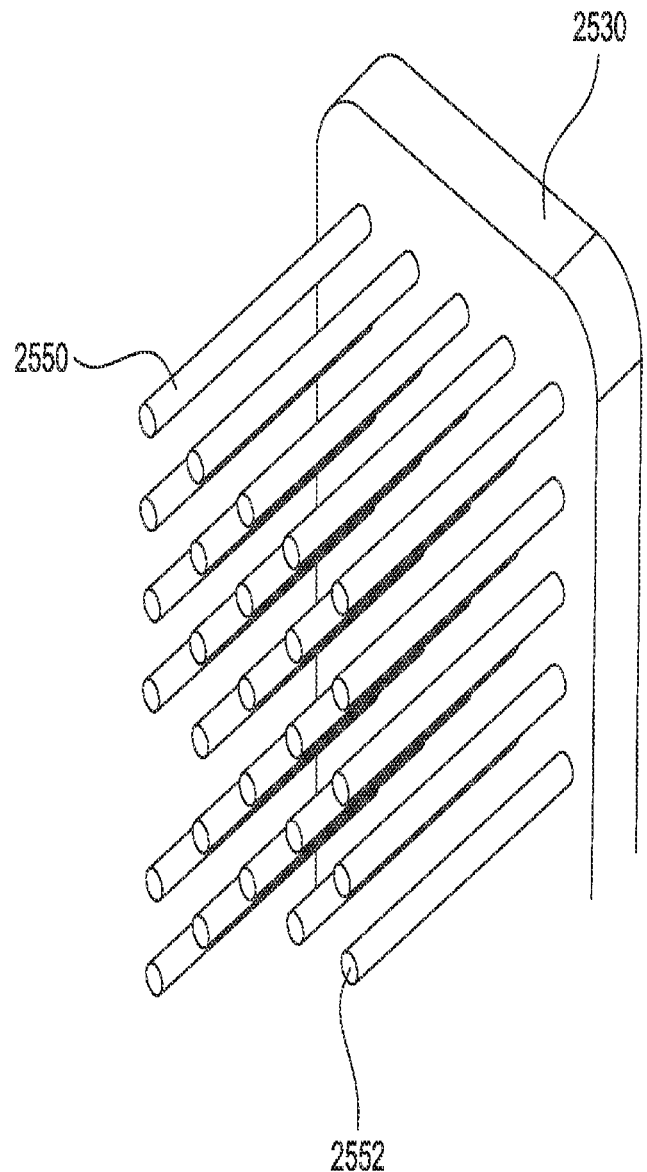
FIG. 43c is a detailed view of the microtube heat exchanger core of FIG. 43b.

With specific references to FIGS. 43a-c, a microtube heat exchanger core 2510 includes a first end plate 2520 and a second end plate 2530, each with an array of openings 2525. A corresponding array of microtubes 2550 are arranged and inserted into the array of openings 2525. For simplicity, only a small number of openings and microtubes are shown, while in application, the microtubes and openings would be much greater in number and much closer together. The microtubes may include standard microtubes 2550 as discussed herein, and reinforced microtubes 2552 for FOD protection. The reinforced microtubes 2552 can include microtubes having the same diameter as standard microtubes 2550, but that are solid, or do not have any opening within the microtube. The solid microtubes 2552 increase the strength and resistance to damage from FOD. In the event that FOD causes any damage to the solid microtubes 2552, a leak path of fluid within the microtube heat exchanger core is not created because fluid does not flow through microtubes 2552.

Though FIGS. 42-43 depict a single line of microtubes being reinforced for FOD protection, it will be understood that other arrangements are contemplated by the present disclosure. For example, in any array of microtubes for a given heat exchanger core, all of the outermost microtubes may be reinforced, either with larger diameter, hollow microtubes 2452, with rods or solid tubes 2552, or with any other type of reinforced microtube. If the array is square, not only the leading edge, but all other edges of microtubes would be reinforced. Similarly, in a circular array of microtubes, each of the outside microtubes could be reinforced.

In accordance with one aspect of the technology, a method of providing heat transfer in an aerospace application is disclosed. The method includes providing two end plates with an array of openings, providing a microtube for each of the openings, each microtube laser welded to the corresponding opening, and placing the microtubes and end plates in a vapor cycle system for an aerospace application. In one aspect of the method, a first fluid flows through the inside of the microtubes and a second fluid flows over the outside of the microtubes. The method can include the microtubes forming one of a cylinder, rectangle, square or horse shoe shape when laser welded to the array of openings.

In aspects of the technology, the method can include arranging the microtubes in an array that forms straight longitudinal rows parallel to the direction of fluid flow and straight transverse rows normal to the direction of fluid flow. In yet other methods, the array of microtubes forms staggered longitudinal and transverse rows.

In some aspects, the configuration of the microtubes can be considered rows and columns of microtubes. For example, a heat exchanger may have 10 rows of microtubes formed in 100 columns to create a rectangular heat exchanger. Any number of rows and columns may be used to form any shape desired. In yet other embodiments, the array of holes in the end plates may be configured to reduce the surface area of the end plate by avoiding strictly linear columns and rows, as depicted herein.

In other aspects of the technology, the present technology also relates to a method for manufacturing microtube heat exchangers. The aerospace industry, as technology improves, has created situations in which a microtube style heat exchanger would solve heating problems. Traditionally, a method of laser welding an array of microtubes of the sizes discussed herein has not existed. Moreover, a method of accounting for growth based on a first weld before welding a second weld, such that the array's accurately welded tube count is at a desirable level, has not existed.

To solve the issue of laser weld accuracy, the present technology includes the method of using a cnc laser path program in conjunction with a cnc vision system to account for the thermal growth within the metal being welded that will create errors in the positions of the array of welds. This present technology thus allows the microtube "successful weld" rate within an array of hundreds or more microtubes to increase from the range of 90% to a range around 99%.

According to aspects of the technology, a method of manufacturing a microtube heat exchanger includes providing two end plates with an array of openings, providing a microtube for each of the openings, using a cnc laser welder to weld a path around the microtubes within the openings, using a cnc vision system to account for the thermal growth within the metal being welded. In aspects, the weld path of a second microtube is adapted or changed based on the thermal growth caused by welding a first microtube.

The foregoing detailed description describes the technology with reference to specific exemplary aspects. However, it will be appreciated that various modifications and changes can be made without departing from the scope of the present technology as set forth in the appended claims. The detailed description and accompanying drawings are to be regarded as merely illustrative, rather than as restrictive, and all such modifications, combination of features, or changes, if any, are intended to fall within the scope of the present technology as described and set forth herein. In addition, while specific features are shown or described as used in connection with particular aspects of the technology, it is understood that different features may be combined and used with different aspects. By way of example only, the microtube heat exchanger may be used with any combination of components in an Environmental control system for aircraft, and may also be used with any number of other components in another aspect of the technology. Likewise, numerous features from various aspects of the technology described herein may be combined in any number of variations as suits a particular purpose.

More specifically, while illustrative exemplary aspects of the technology have been described herein, the present technology is not limited to these aspects, but includes any and all aspects having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, with reference to the present technology, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the technology should be determined solely by the appended claims and their legal equivalents, rather than by the descriptions and examples given above.

The invention claimed is:

1. A microtube heat exchanger of an aerospace environmental control system (ECS), the microtube heat exchanger comprising:
   a first and a second header, wherein the first header is coupled with a coolant fluid return line of the ECS and the second header is coupled with a coolant fluid supply line of the ECS; and
   a plurality of microtubes disposed between the first and second headers, each of the plurality of microtubes configured to transfer coolant fluid between the first and second headers, wherein the plurality of microtubes are bundled to form a tube stack;
   a heat exchanger body surrounding the tube stack and comprising:
      a shell-side fluid inlet configured to receive a shell-side fluid into an interior of the heat exchanger body to flow past an exterior of the plurality of microtubes, and
      a shell-side fluid outlet configured to discharge the shell-side fluid from the interior of the heat exchanger body; and
   a flow direction plate disposed in an interior of the tube stack in a position to increase a length of a path traveled by the shell-side fluid flowing from the shell-side fluid inlet to the shell-side fluid outlet.

2. The microtube heat exchanger of claim 1, further comprising a plurality of the flow direction plates, wherein the plurality of the flow direction plates are positioned to increase the length of the path traveled by the shell-side fluid flowing from the shell-side fluid inlet to the shell-side fluid outlet.

3. The microtube heat exchanger of claim 2, wherein the path traveled by the shell-side fluid and created by the plurality of flow direction plates is generally a serpentine-shaped path.

4. The microtube heat exchanger of claim 1, wherein the shell-side fluid inlet and the shell-side fluid outlet are disposed on a same side of the heat exchanger body.

5. The microtube heat exchanger of claim 1, wherein the shell-side fluid inlet and the shell-side fluid outlet are disposed on opposite sides of the heat exchanger body.

6. The microtube heat exchanger of claim 1, wherein the ECS is used for cooling and heating of a human occupant compartment of an aerospace.

7. The microtube heat exchanger of claim 1, wherein each of the plurality of microtubes has a generally circular cross-section.

8. The microtube heat exchanger of claim 1, wherein:
each of the plurality of microtubes has a generally square-shaped or rectangular cross-section; and
the plurality of microtubes are arranged such that the square-shaped or rectangular cross-section of each of the plurality of microtubes is used to bias a direction of flow of a shell-side fluid that flows past an exterior of the plurality of microtubes.

9. The microtube heat exchanger of claim 1, wherein:
each of the plurality of microtubes has a generally triangular-shaped cross-section; and
the plurality of microtubes are arranged such that triangular-shaped cross-section of each of the plurality of microtubes is used to bias a direction of flow of a shell-side fluid that flows past an exterior of the plurality of microtubes.

10. The microtube heat exchanger of claim 1, wherein:
each of the plurality of microtubes has a generally elliptical cross-section; and
the plurality of microtubes are arranged such the elliptical cross-section of each of the plurality of microtubes is used to bias a direction of flow of a shell-side fluid that flows past an exterior of the plurality of microtubes.

11. A microtube heat exchanger of an aircraft environmental control system (ECS), the microtube heat exchanger comprising:
a first and a second header, wherein the first header is configured to be coupled with a coolant fluid return line of the aircraft ECS and the second header is configured to be coupled with a coolant fluid supply line of the aircraft ECS;
a tube stack disposed between the first and second headers and comprising a plurality of microtubes, each of the plurality of microtubes having a shell-side and an inside, which is configured to transfer coolant fluid between the first and second headers;
a heat exchanger body surrounding the tube stack and comprising:
a shell-side fluid inlet configured to receive a shell-side fluid into an interior of the heat exchanger body to flow past an exterior of the plurality of microtubes, and
a shell-side fluid outlet configured to discharge the shell-side fluid from the interior of the heat exchanger body; and
a flow direction plate disposed in an interior of the tube stack in a position to increase a length of a path traveled by the shell-side fluid flowing from the shell-side fluid inlet to the shell-side fluid outlet.

12. The microtube heat exchanger of claim 11, further comprising a plurality of the flow direction plates,
wherein the plurality of the flow direction plates are positioned to increase the length of the path traveled by the shell-side fluid flowing from the shell-side fluid inlet to the shell-side fluid outlet.

13. The microtube heat exchanger of claim 12, wherein the path traveled by the shell-side fluid and created by the plurality of flow direction plates is generally a serpentine-shaped path.

14. The microtube heat exchanger of claim 11, wherein the shell-side fluid inlet and the shell-side fluid outlet are disposed on a same side of the heat exchanger body.

15. The microtube heat exchanger of claim 11, wherein the shell-side fluid inlet and the shell-side fluid outlet are disposed on opposite sides of the heat exchanger body.

16. The microtube heat exchanger of claim 11, wherein the TMS is part of an aerospace heat exchange system.

17. The microtube heat exchanger of claim 11, wherein the TMS is part of an aerospace environmental control system (ECS).

18. The microtube heat exchanger of claim 11, wherein:
each of the plurality of microtubes has a generally square-shaped or rectangular cross-section; and
the plurality of microtubes are arranged such that the square or rectangular shape of each of the plurality of microtubes is used to bias a direction of flow of the shell-side fluid.

19. The microtube heat exchanger of claim 11, wherein:
each of the plurality of microtubes has a generally elliptical cross-section; and
the plurality of microtubes are arranged such that the elliptical shape of each of the plurality of microtubes is used to bias a direction of flow of the shell-side fluid.

* * * * *